US012776590B2

(12) United States Patent
Woo et al.

(10) Patent No.: US 12,776,590 B2
(45) Date of Patent: Oct. 27, 2026

(54) ANTENNA MODULE HAVING ADJUSTED RADIATION PATTERN, AND ELECTRONIC DEVICE COMPRISING SAME

(71) Applicant: LG ELECTRONICS INC., Seoul (KR)

(72) Inventors: Seungmin Woo, Seoul (KR); Yusuhk Suh, Seoul (KR); Dongik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/064,232

(22) Filed: Feb. 26, 2025

(65) Prior Publication Data

US 2025/0202133 A1 Jun. 19, 2025

Related U.S. Application Data

(63) Continuation of application No. 18/709,450, filed as application No. PCT/KR2021/016327 on Nov. 10, 2021, now Pat. No. 12,300,895.

(51) Int. Cl.
*H01Q 1/48* (2006.01)
*H01Q 1/24* (2006.01)
(Continued)

(52) U.S. Cl.
CPC ............. *H01Q 21/065* (2013.01); *H01Q 1/24* (2013.01); *H01Q 1/36* (2013.01); *H01Q 1/48* (2013.01)

(58) Field of Classification Search
CPC ......... H01Q 21/065; H01Q 1/241–243; H01Q 1/38; H01Q 1/48; H01Q 1/52; H01Q 9/0407
See application file for complete search history.

(56) References Cited

U.S. PATENT DOCUMENTS

| | | | | |
|---|---|---|---|---|
| 8,842,045 | B2 * | 9/2014 | Tatarnikov ............. | H01Q 21/30 343/846 |
| 10,594,019 | B2 | 3/2020 | Baks et al. | |

(Continued)

FOREIGN PATENT DOCUMENTS

| | | |
|---|---|---|
| KR | 10-0917847 | 9/2009 |
| KR | 10-1679281 | 11/2016 |

(Continued)

OTHER PUBLICATIONS

Korean Intellectual Property Office Application No. 10-2024-7009083, Notice of Allowance dated Jul. 3, 2024, 6 pages.

(Continued)

*Primary Examiner* — Hasan Islam
(74) *Attorney, Agent, or Firm* — LEE, HONG, DEGERMAN, KANG & WAIMEY

(57) ABSTRACT

The antenna module implemented using a multi-layer substrate comprises: a radiator which is arranged in the inner region or the upper region of the multi-layer substrate, and which has at least one conductive layer to radiate a wireless signal; a feeding structure connected to the radiator through a signal via arranged in the lower region of the radiator; a lower ground layer which is arranged in the lower region of the conductive layer constituting the radiator and which operates as a ground for the radiator; and a multi-layer ground structure which is connected to the lower ground layer, and which has end portion positions that differ for each layer of the multi-layer substrate so as to be spaced different distances apart from the radiator for each layer of the multi-layer substrate.

11 Claims, 28 Drawing Sheets

(51) Int. Cl.

| | |
|---|---|
| ***H01Q 1/36*** | (2006.01) |
| ***H01Q 21/06*** | (2006.01) |

(56) References Cited

U.S. PATENT DOCUMENTS

| | | | | |
|---|---|---|---|---|
| 11,276,926 | B2 | 3/2022 | Yun et al. | |
| 11,424,543 | B2 * | 8/2022 | Carceller | H01Q 21/0087 |
| 2020/0161767 | A1 | 5/2020 | Hara et al. | |
| 2024/0332821 | A1 | 10/2024 | Woo et al. | |

FOREIGN PATENT DOCUMENTS

| | | |
|---|---|---|
| KR | 10-2019-0062022 | 6/2019 |
| KR | 10-2020-0026234 | 3/2020 |
| KR | 10-2020-0085892 | 7/2020 |
| KR | 10-2020-0112581 | 10/2020 |
| KR | 10-2022-0136989 | 10/2022 |

OTHER PUBLICATIONS

United States Patent and Trademark Office U.S. Appl. No. 18/709,450, Office Action dated Aug. 30, 2024, 10 pages.

Korean Intellectual Property Office Application No. 10-2024-7026458, Office Action dated Sep. 26, 2025, 6 pages.

PCT International Application No. PCT/KR2021/016327, International Search Report dated Aug. 9, 2022, 5 pages.

* cited by examiner (a)

(b)

(a)

(b)

(a)

(b)

(a)

(b)

(a)

(b)

ANTENNA MODULE HAVING ADJUSTED RADIATION PATTERN, AND ELECTRONIC DEVICE COMPRISING SAME

CROSS-REFERENCE TO RELATED APPLICATIONS

This application is a continuation of U.S. patent application Ser. No. 18/709,450, filed on May 10, 2024, which is the National Stage filing under 35 U.S.C. 371 of International Application No. PCT/KR2021/016327, filed on Nov. 10, 2021, the contents of which are all hereby incorporated by reference herein their entirety.

TECHNICAL FIELD

The present disclosure relates to an antenna module and an electronic device including the same. Particular implementations relate to an antenna module having an adjusted radiation pattern and an electronic device including the same.

BACKGROUND ART

As functions of electronic devices diversify, the electronic devices can be implemented as image display devices such as multimedia players having complex functions, for example, playing music or video files, playing games, receiving broadcasts, and the like.

An image display device is a device for reproducing (playing) image contents. Image display devices receive images (videos) from various sources and reproduce the received images. Image display devices are implemented as various devices such as PCs (Personal Computers), smart phones, tablet PCs, laptop computers, TV sets, and the like. An image display device such as a smart TV may provide an application for providing web contents, such as web browsers.

The electronic device such as the image display device may include a communication module having antennas to perform communications with neighboring electronic devices. Meanwhile, as a display area (region) of an image display device is expanded recently, a disposition space of a communication module including antennas is reduced. This causes an increase in necessity of disposing antennas inside a multi-layered circuit board on which the communication module is implemented.

A WiFi wireless interface may be considered as an interface for a communication service between electronic devices. When using such a WiFi wireless interface, a millimeter wave (mmWave) band may be used for high-speed data transmission between the electronic devices. In particular, the high-speed data transmission between the electronic devices is achieved using a wireless interface such as 802.11ay.

In this regard, an array antenna that can operate in a millimeter wave (mmWave) band may be mounted in an antenna module. However, an antenna disposed in the antenna module and an electronic component such as a transceiver circuit are electrically connected to each other. To this end, the transceiver circuit may be operably coupled to the antenna module and the antenna module may be configured in the form of a multi-layer substrate.

In this regard, the radiation pattern of a signal radiated from the antenna module may radiate in a vertical direction of the multi-layer substrate. Meanwhile, there is a problem in that communication disconnection may occur when there is an obstacle on a communication path when communicating between electronic devices disposed with such antenna modules. In this regard, as the radiation pattern of the signal radiated from the antenna module is disposed in a direction perpendicular to the multi-layer substrate, communication disconnection occurs on a communication path in which there is an obstacle.

DISCLOSURE OF INVENTION

Technical Problem

The present disclosure is directed to solving the aforementioned problems and other drawbacks. Another aspect of the present disclosure is to provide a broadband antenna module operating in a millimeter wave (mm Wave) band and an electronic device including the same.

Still another aspect of the present disclosure is to change a direction of a signal radiated from an antenna element operating in a millimeter wave band.

Yet still another aspect of the present disclosure to change a direction of a signal radiated from an antenna element operating in a millimeter wave band so as to prevent communication disconnection even when there is an obstacle on a communication path.

Still yet another aspect of the present disclosure is to allow a radiation pattern of a signal radiated from an antenna element to be tilted by a predetermined angle from a vertical direction without beamforming.

Yet still another aspect of the present disclosure is to allow a radiation pattern of a signal radiated from an antenna element to be tilted by a predetermined angle from a vertical direction without disposing an antenna module at an angle.

Solution to Problem

In order to achieve the foregoing and other objectives, an antenna module implemented as a multi-layer substrate according to an embodiment may include a radiator disposed on an inner region or upper region of the multi-layer substrate, and configured with at least one conductive layer to radiate a wireless signal; a feed structure configured to be connected to the radiator through a signal via disposed in a lower region of the radiator; a lower ground layer disposed in a lower region of the conductive layer constituting the radiator, and configured to operate as a ground for the radiator; and a multi-layer ground structure connected to the lower ground layer, and configured to have a different end position for each layer so as to be spaced apart by a different distance from the radiator for each layer of the multi-layer substrate.

In an embodiment, the multi-layer ground structure may be configured to have a plurality of ground layers. The plurality of ground layers may be disposed in a side region as being disposed in the lower region. Therefore, the plurality of ground layers may be configured to further decrease a length of each ground layer disposed in the each layer in one axial direction in the lower region.

In an embodiment, the multi-layer ground structure may include vertical vias vertically connecting between ground layers adjacent thereto. Each ground layer disposed in the each layer may be configured to further decrease a length thereof in one axial direction in the lower region, and the plurality of ground layers may be configured such that a number of vertical vias decreases as being disposed in the lower region.

In an embodiment, the antenna module may further include a dummy patch disposed in one region of the radiator, and disposed in the other region of the radiator to be spaced apart by a predetermined distance from the radiator.

In an embodiment, the radiator and the dummy patch may be disposed in the same layer, and the dummy patch may be disposed along an outline of the radiator to correspond to a shape of the radiator.

In an embodiment, the radiator may be a circular patch disposed in a first layer, and the dummy patch may be disposed in an arc shape with a predetermined angle range in the first layer. The radiator may include a first radiator disposed in the first layer; and a second radiator disposed in a second layer, which is a lower region of the first radiator, to be offset from the center of the first radiator, and configured with a second conductive layer that transmits a wireless signal to the first radiator.

In an embodiment, the first radiator and the second radiator may be disposed as a first patch antenna and a second patch antenna, respectively. The second patch antenna may be connected to a feed line through the signal via at a first point that is offset in one axial direction.

In an embodiment, the antenna module may further include a third patch antenna, which is a third radiator connected to a second feed line through a second signal via at a second point that is offset in the other axial direction orthogonal to the one axial direction. The second patch antenna and the third patch antenna may be disposed in the one axial direction and the other axial direction in the same layer of the multi-layer substrate.

In an embodiment, the multi-layer ground structure may include a first ground structure configured such that the vertical via is disposed in one side region of the multi-layer substrate; and a second ground structure configured to be connected to the lower ground layer by a second vertical via at a second position spaced apart by a predetermined distance from one side end of the multi-layer substrate.

In an embodiment, the multi-layer ground structure may include a first ground structure configured such that the vertical via is disposed in one side region of the multi-layer substrate; a ground wall connected to the lower ground layer to constitute the other side region of the multi-layer substrate; and a third ground structure disposed in a lower region of the dummy patch in a region between the ground wall and the radiator, and configured to be connected to the lower ground layer by a third vertical via at a third position spaced apart by a predetermined distance from the other side end of the multi-layer substrate.

In an embodiment, the second radiator and the third radiator may be configured not to be connected to the first radiator such that a first signal from the second radiator and a second signal from the third radiator are coupled to the first radiator.

In an embodiment, the second radiator and the third radiator may be configured to be connected to the first radiator through a vertical via such that a first signal from the second radiator and a second signal from the third radiator are directly transmitted to the first radiator.

In an embodiment, the radiator may include an upper radiator disposed in the first layer and configured to operate in a first frequency band; and a lower radiator disposed in a second layer, which is a lower region of the first radiator, and configured to have a larger size than the first radiator to operate in a second frequency band lower than the first frequency band. The lower radiator may be connected to a feed line through a signal via at a first point that is offset in one axial direction, and connected to a second feed line through a second signal via at a second point that is offset in the other axial direction orthogonal to the one axial direction.

In an embodiment, the multi-layer ground structure may include a first ground structure configured such that the vertical via is disposed in one side region of the multi-layer substrate, and disposed to have a first length in a first layer; and a second ground structure configured to be connected to the lower ground layer by a second vertical via at a second position spaced apart by a predetermined distance from one side end of the multi-layer substrate, and disposed to have a second length shorter than the first length.

In an embodiment, the first ground structure may be configured to operate with the lower radiator in the second frequency band, and the second ground structure may be configured to operate with the upper radiator in the first frequency band.

In an embodiment, the dummy patch may include a first dummy patch disposed between the radiator and a ground wall disposed in the other region of the multi-layer substrate; and a second dummy patch disposed between the radiator and the multi-layer ground structure disposed in one region of the multi-layer substrate. The second dummy patch may include first and second dummy patterns. The first and second dummy patterns may be disposed to be spaced apart from each other or connected to each other by a vertical via in a first layer and a second layer, which is a lower layer of the first layer, or disposed to be spaced apart from each other by a predetermined distance in the first layer.

In an embodiment, the antenna module may constitute an array antenna in which a plurality of the radiators are arranged at a predetermined distance in at least one axial direction. The array antenna may include a first antenna element and a second antenna element adjacent to the first antenna element. One end of a ground wall disposed between the first antenna element and the second antenna element may be configured with the multi-layer ground structure.

In an embodiment, the array antenna may further include a third antenna element adjacent to the second antenna element and a fourth antenna element adjacent to the third antenna element. A first feed patch may be disposed in one region of the first antenna element and a second feed patch may be disposed in the other region of the second antenna element in the one axial direction. A third feed patch may be disposed in one region of the third antenna element and a fourth feed patch may be disposed in the other region of the fourth antenna element in the one axial direction. The multi-layer ground structure in which the one end is configured with the multi-layer ground structure may be disposed between the first feed patch and the second feed patch and between the third feed patch and the fourth feed patch.

An electronic device having an antenna module according to another aspect of the present disclosure may include an antenna module; a transceiver circuit disposed in the antenna module configured with a multi-layer substrate; and a main PCB disposed inside the electronic device to be operably coupled to the multi-layer substrate. The antenna module may include a radiator disposed on an inner region or upper region of the multi-layer substrate, and configured with at least one conductive layer to radiate a wireless signal; a feed structure configured to be connected to the radiator through a signal via disposed in a lower region of the radiator; a lower ground layer disposed in a lower region of the conductive layer constituting the radiator, and configured to operate as a ground for the radiator; and a multi-layer ground structure connected to the lower ground layer, and configured to have a different end position for each layer so as to be spaced apart by a different distance from the radiator for each layer of the multi-layer substrate.

In an embodiment, the antenna module may further include a dummy patch disposed in one region of the radiator and disposed to be spaced apart by a predetermined distance from the radiator in the other region of the radiator. The radiator and the dummy patch may be disposed in the same layer, and the dummy patch may be disposed along an outline of the radiator to correspond to a shape of the radiator. The radiator may include a first radiator disposed in the first layer; and a second radiator disposed in a second layer, which is a lower region of the first radiator, to be offset from the center of the first radiator, and configured with a second conductive layer that transmits a wireless signal to the first radiator.

In an embodiment, the multi-layer ground structure may include a first ground structure configured such that the vertical via is disposed in one side region of the multi-layer substrate; and a second ground structure configured to be connected to the lower ground layer by a second vertical via at a second position spaced apart by a predetermined distance from one side end of the multi-layer substrate.

In an embodiment, the antenna module may constitute an array antenna in which a plurality of the radiators are arranged at a predetermined distance in at least one axial direction. The array antenna may include a first antenna element and a second antenna element adjacent to the first antenna element, and one end of a ground wall disposed between the first antenna element and the second antenna element may be configured with the multi-layer ground structure. A processor disposed on the main PCB may control the transceiver circuit such that the array antenna radiates a wireless signal to another electronic device.

In an embodiment, the radiator may include an upper radiator disposed in the first layer and configured to operate in a first frequency band; and a lower radiator disposed in a second layer, which is a lower region of the first radiator, and configured to have a larger size than the first radiator to operate in a second frequency band lower than the first frequency band.

In an embodiment, the processor may control the transceiver circuit to perform wireless communication using a first wireless signal in a first band radiated through the upper radiator of the array antenna. The processor may control, when the quality of the first wireless signal is below a threshold value, the transceiver circuit to perform wireless communication using a second wireless signal in a second band radiated through the lower radiator of the array antenna. The transceiver circuit may apply a first signal in the first band to the lower radiator through a first feed line connected to the feed structure, and apply a second signal in the second band to the lower radiator through a second feed line connected to the feed structure.

Advantageous Effects of Invention

Hereinafter, technical effects of a broadband antenna module operating in a millimeter wave (mm Wave) band and an electronic device having the same will be described.

According to an embodiment, a broadband antenna module operating in a millimeter wave band may be disposed in an electronic device to provide a high-speed communication service with another electronic device.

According to an embodiment, a ground structure of an antenna module operating in a millimeter wave band may be optimized to change a direction of a signal radiated from an antenna element so as to provide a highly reliable, high-speed communication service between electronic devices.

According to an embodiment, a ground structure and a dummy patch structure of an antenna module operating in a millimeter wave band may be optimized to prevent communication disconnection even when there is an obstacle on a communication path.

According to an embodiment, a radiation pattern of a signal radiated from an antenna element may be tilted by a predetermined angle from a vertical direction without beamforming, thereby preventing communication disconnection even when there is an obstacle on a communication path.

According to an embodiment, a multi-layer ground structure may be optimized without disposing an antenna module at an angle to allow a radiation pattern of a signal radiated from an antenna element to be tilted by a predetermined angle from a vertical direction.

Further scope of applicability of the present disclosure will become apparent from the following detailed description. It should be understood, however, that the detailed description and specific examples, such as the preferred embodiments of the present disclosure, are given by way of illustration only, since various modifications and alternations within the concept and scope of the disclosure will be apparent to those skilled in the art.

MODE FOR THE INVENTION

Figure 1:
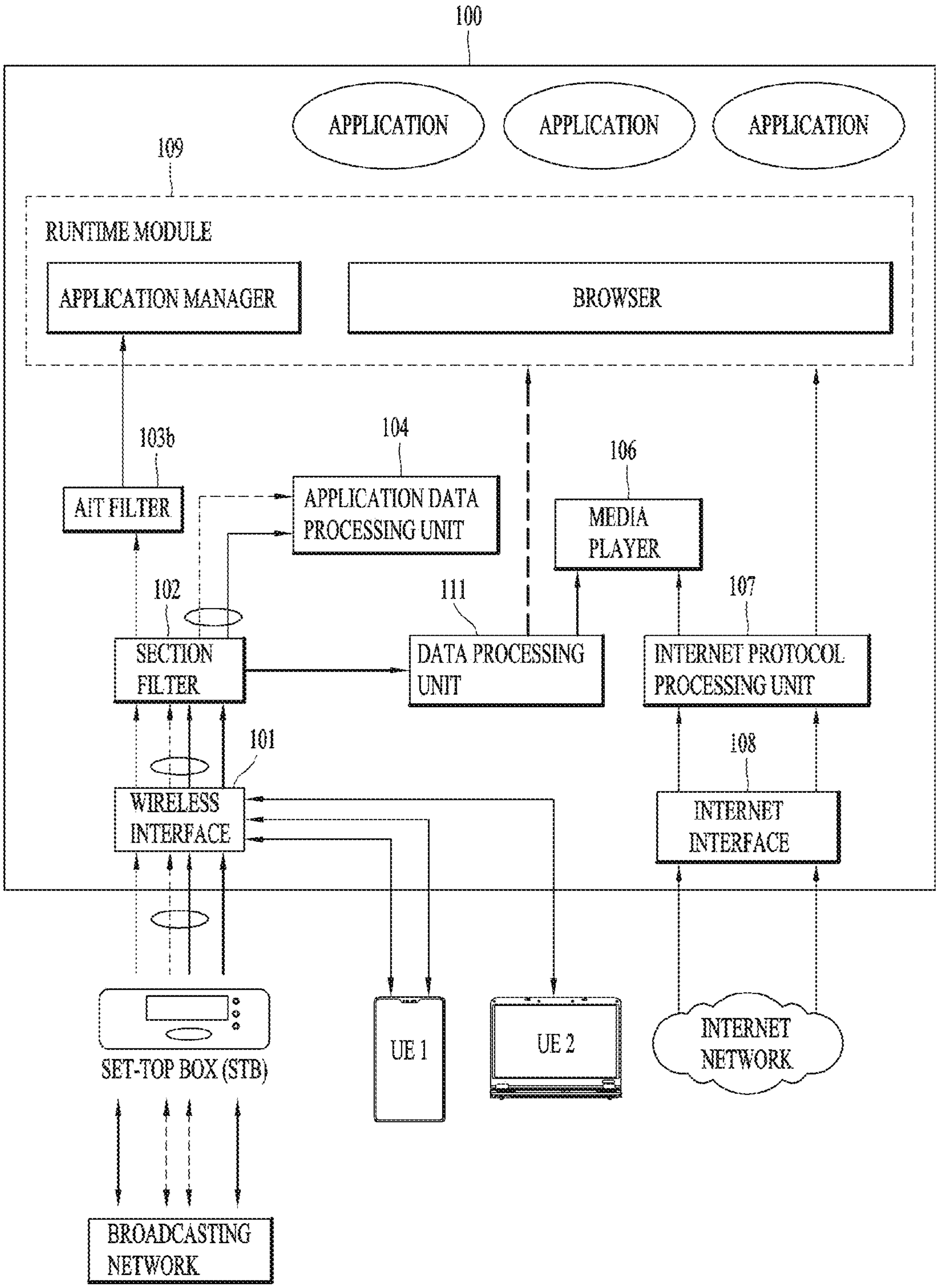
FIG. 1 is a diagram schematically showing an example of an entire wireless AV system including an image display device according to one embodiment of the present disclosure.

Hereinafter, description for disclosed in this specification will be described in detail with reference to the accompanying drawings, wherein the same or similar elements will be denoted by the same reference numerals independent of the drawing numerals, and overlapping description of the same or similar elements will be omitted. The suffixes “module” and “unit” used for elements in the following description are used only to simplify the disclosure, and therefore do not have meanings or functions that distinguish elements from each other in themselves. In describing embodiments disclosed in this specification, moreover, the detailed description will be omitted when specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

The terms including an ordinal number such as first, second, etc. can be used to describe various elements, but the elements should not be limited by those terms. The terms are used merely for the purpose to distinguish an element from the other element.

It will be understood that when an element is referred to as being “connected with” another element, the element can be connected with the other element or intervening elements may also be present. On the contrary, it should be understood that when it is mentioned herein that an element is “directly connected” or “directly coupled” to another element, a still another element may not be present therebetween.

A singular representation may include a plural representation unless it represents a definitely different meaning from the context.

Terms “include” or “have” used herein should be understood that they are intended to indicate the presence of a feature, a number, a step, an element, a component or a combination thereof disclosed in the specification, and it may also be understood that the presence or additional possibility of one or more other features, numbers, steps, elements, components or combinations thereof are not excluded in advance.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

However, it may be easily understood by those skilled in the art that the configuration according to the embodiments of this specification can also be applied to stationary terminals such as digital TV, desktop computers, digital signages, and the like, excluding a case of being applicable only to the mobile terminals.

FIG. 1 is a diagram schematically showing an example of an entire wireless AV system including an image display device according to one embodiment of the present disclosure.

As illustrated in FIG. 1, an image display device 100 according to one embodiment of the present disclosure is connected to the wireless AV system (or a broadcasting network) and an Internet network. The image display device 100 may be, for example, a network TV, a smart TV, a hybrid broadcast broadband TV (HBBTV), or the like.

The image display device 100 may be wirelessly connected to the wireless AV system (or the broadcasting network) via a wireless interface or wirelessly or wiredly connected to the Internet network via an Internet interface. In relation to this, the image display device 100 may be connected to a server or another electronic device via a wireless communication system. As an example, the image display device 100 needs to provide an 802.11ay communication service operating in a millimeter wave (mm Wave) band to transmit or receive large-capacity data at a high speed.

The mmWave band may be any frequency band in a range of 10 GHz to 300 GHz. In this disclosure, the mmWave band may include an 802.11ay band of a 60 GHz band. In addition, the mm Wave band may include a 5G frequency band of a 28 GHz band or the 802.11ay band of the 60 GHz band. The 5G frequency band may be set to about 24 to 43 GHz band and the 802.11ay band may be set to 57 to 70 GHz or 57 to 63 GHz band, but are not limited thereto.

The image display device 100 may wirelessly transmit or receive data to/from an electronic device in a periphery of the image display device 100, e.g., a set-top box or another electronic device via the wireless interface. As an example, the image display device 100 may transmit or receive wireless AV data to/from a set-top box or another electronic device, e.g., a mobile terminal arranged in front of or below the image display device 100.

The image display device 100 includes, for example, a wireless interface 101*b*, a section filter 102*b*, an application information table (AIT) filter 103*b*, an application data processing unit 104*b*, a data processing unit 111*b*, a media player 106*b*, an Internet protocol processing unit 107*b*, an Internet interface 108*b*, and a runtime module 109*b*.

Through a broadcast interface that is the wireless interface 101*b*, AIT data, real-time broadcast content, application data, and a stream event are received. The real-time broadcast content may be referred to as linear audio/video (A/V) content.

The section filter 102*b* performs section filtering on four types of data received through the wireless interface 101*b* to transmit the AIT data to the AIT filter 103*b*, the linear A/V content to the data processing unit 111*b*, and the stream events and the application data to the application data processing unit 104*b*.

Non-linear A/V content and the application data are received through the Internet interface 108*b*. The non-linear A/V content may be, for example, a content on demand (COD) application. The non-linear A/V content is transmitted to the media player 106*b*, and the application data is transmitted to the runtime module 109*b*.

Further, the runtime module 109*b* includes, for example, an application manager and a browser as illustrated in FIG. 1. The application manager controls a life cycle of an interactive application using, for example, the AIT data. In addition, the browser performs, for example, a function of displaying and processing the interactive application.

Hereinafter, a communication module having an antenna for providing a wireless interface in an electronic device such as the above-described image display device will be described in detail. In relation to this, the wireless interface for communication between electronic devices may be a WiFi wireless interface, but is not limited thereto. As an example, a wireless interface supporting the 802.11ay standard may be provided for high-speed data transmission between electronic devices.

The 802.11ay standard is a successor standard for raising a throughput for the 802.11ad standard to 20 Gbps or greater. An electronic device supporting an 802.11ay wireless interface may be configured to use a frequency band of about 57 to 64 GHz. The 802.11ay wireless interface may be configured to provide backward compatibility for an 802.11ad wireless interface. The electronic device providing the 802.11ay wireless interface may be configured to provide coexistence with a legacy device using the same band.

In relation to a wireless environment for the 802.11ay standard, it may be configured to provide a coverage of 10 meters or longer in an indoor environment, and 100 meters or longer in an outdoor environment with a line of sight (LOS) channel condition.

The electronic device supporting the 802.11ay wireless interface may be configured to provide visual reality (VR) headset connectivity, support server backups, and support cloud applications that require low latency.

An ultra-short range (USR) communication scenario, i.e., a near field communication scenario which is a use case of the 802.11ay wireless interface, is a model for fast large-capacity data exchange between two terminals. The USR communication scenario may be configured to require low power consumption of less than 400 mW, while providing a fast link setup within 100 msec, transaction time within 1 second, and a 10 Gbps data rate at a very close distance of less than 10 cm.

As the use case of the 802.11ay wireless interface, the 8K UHD Wireless Transfer at Smart Home Usage Model may be taken into account. In the Smart Home Usage Model, a wireless interface between a source device and a sync device may be taken into consideration to stream 8K UHD content at home. In relation to this, the source device may be one of a set-top box, a Blue-ray player, a tablet PC, and a smart phone and the sink device may be one of a smart TV and a display device, but are not limited thereto. In relation to this, the wireless interface may be configured to transmit uncompressed 8K UHD streaming data (60 fps, 24 bits per pixel, at least 4:2:2) with a coverage of less than 5 m between the source device and the sink device. To do so, the wireless interface may be configured such that data is transmitted between electronic devices at a speed of at least 28 Gbps.

In order to provide such a wireless interface, embodiments related to an array antenna operating in an mmWave band and an electronic device including the array antenna will be described with reference to the accompanying drawings. It will be apparent to those skilled in the art that the present disclosure may be embodied in other specific forms without departing from the spirit or essential characteristics thereof.

Figure 2:
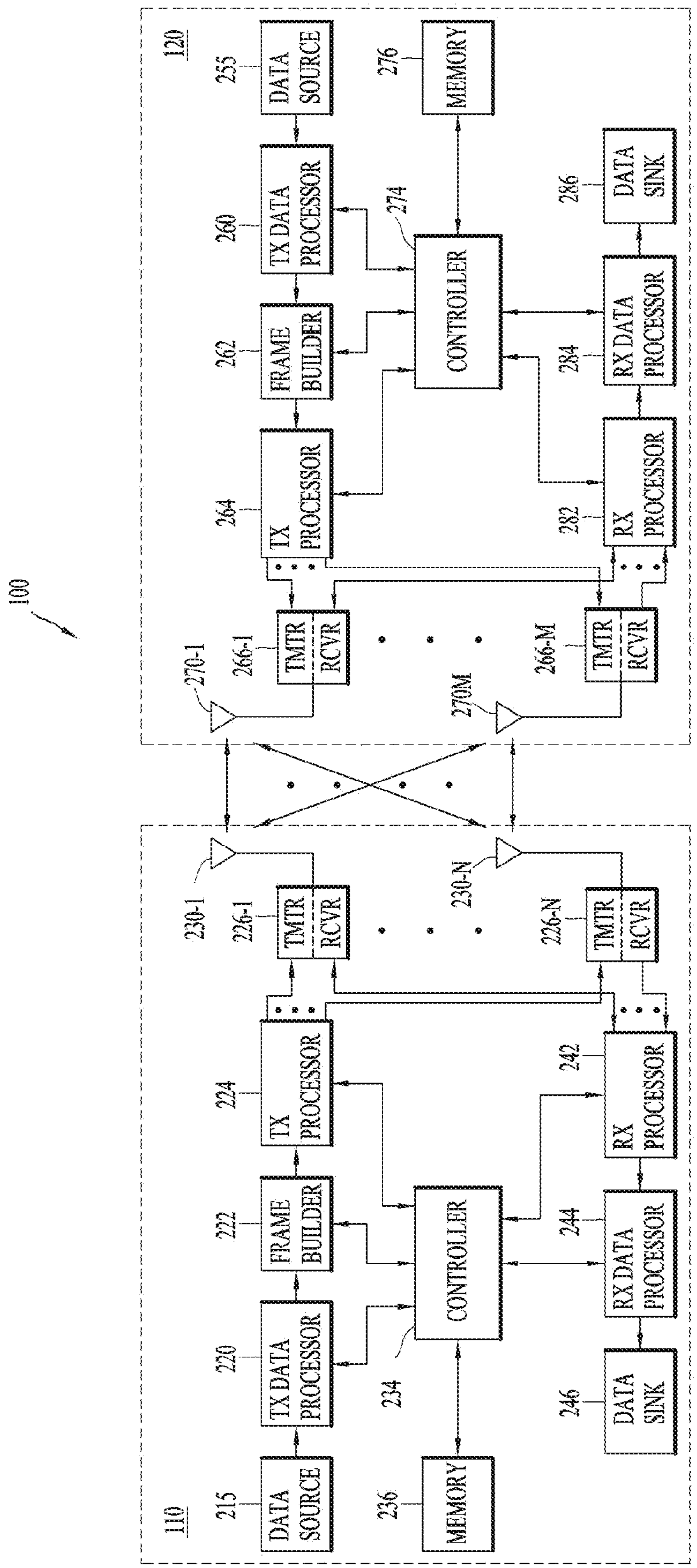
FIG. 2 shows a detailed configuration of electronic devices configured to support wireless interfaces according to the present disclosure.

FIG. 2 shows a detailed configuration of electronic devices configured to support wireless interfaces according to the present disclosure. FIG. 2 illustrates a block diagram of an access point 110 (generally, a first wireless node) and an access terminal 120 (generally, a second wireless node) in a wireless communication system. The access point 110 is a transmitting entity for downlink transmission and a receiving entity for uplink transmission. The access terminal 120 is a transmitting entity for uplink transmission and a receiving entity for downlink transmission. As used herein, the "transmitting entity" is an independently operating apparatus or device capable of transmitting data through a wireless channel, and the "receiving entity" is an independently operating apparatus or device capable of receiving data through a wireless channel.

Referring to FIGS. 1 and 2, the set-top box (STB) of FIG. 1 may be the access point 110, and an electronic device, that is, the image display device 100 of FIG. 1 may be the access terminal 120, but are not limited thereto. Accordingly, it should be understood that the access point 110 may alternatively be an access terminal, and the access terminal 120 may alternatively be an access point.

To transmit data, the access point 110 includes a transmission (TX) data processor 220, a frame builder 222, a TX processor 224, a plurality of transceivers 226-1 to 226-N, and a plurality of antennas 230-1 to 230-N. The access point 110 also includes a controller 234 configured to control operations of the access point 110.

To transmit data, the access point 110 includes a transmission (TX) data processor 220, a frame builder 222, a TX processor 224, a plurality of transceivers 226-1 to 226-N, and a plurality of antennas 230-1 to 230-N. The access point 110 also includes a controller 234 configured to control operations of the access point 110.

During operation, the TX data processor 220 receives data (e.g., data bits) from a data source 215, and processes the data for transmission. For example, the TX data processor 220 may encode data (e.g., data bits) into encoded data, and modulate the encoded data into data symbols. The TX data processor 220 may support different modulation and coding schemes (MCSs). For example, the TX data processor 220 may encode data at any one of a plurality of different coding rates (e.g., using low-density parity check (LDPC) encoding). In addition, the TX data processor 220 may modulate the encoded data using any one of a plurality of different modulation schemes including, but not limited to, BPSK, QPSK, 16 QAM, 64 QAM, 64 APSK, 128 APSK, 256 QAM, and 256 APSK.

The controller 234 may transmit, to the TX data processor 220, a command for specifying an MCS to be used (e.g., based on channel conditions for downlink transmission). The TX data processor 220 may encode and modulate the data received from the data source 215 according to the specified MCS. It needs to be recognized that the TX data processor 220 may perform additional processing on the data, such as data scrambling and/or other processing. The TX data processor 220 outputs the data symbols to the frame builder 222.

The frame builder 222 constructs a frame (also referred to as a packet) and inserts the data symbols into a data payload of the frame. The frame may include a preamble, a header, and a data payload. The preamble may include a short training field (STF) sequence and a channel estimation (CE) sequence to assist the access terminal 120 in receiving the frame. The header may include information regarding data in a payload, such as a length of the data and an MCS used to encode and modulate the data. Based on this information, the access terminal 120 may demodulate and decode the data. The data in the payload may be partitioned among a plurality of blocks, and each block may contain a part of the data and a guard interval (GI) to assist the receiver in phase tracking. The frame builder 222 outputs the frame to the TX processor 224.

The TX processor 224 processes the frame for transmission on downlink. For example, the TX processor 224 may support different transmission modes, e.g., an orthogonal frequency-division multiplexing (OFDM) transmission mode and a single-carrier (SC) transmission mode. In this example, the controller 234 may transmit, to the TX processor 224, a command for specifying a transmission mode to be used, and the TX processor 224 may process the frame for transmission according to the specified transmission mode. The TX processor 224 may apply a spectrum mask to the frame so that a frequency configuration of a downlink signal complies with particular spectrum requirements.

The TX processor 224 may support multiple-input-multiple-output (MIMO) transmission. In these aspects, the access point 110 may include a plurality of antennas 230-1 to 230-N and a plurality of transceivers 226-1 to 226-N (e.g., one for each antenna). The TX processor 224 may perform spatial processing on incoming frames and provide a plurality of transmission frame streams to a plurality of antennas. The transceivers 226-1 to 226-N receive and process (e.g., convert to analog, amplify, filter, and frequency up-convert) each of the transmission frame streams to generate transmission signals for transmission through the antennas 230-1 to 230-N.

To transmit data, the access terminal 120 includes a TX data processor 260, a frame builder 262, a TX processor 264, a plurality of transceivers 266-1 to 266-M, and a plurality of antennas 270-1 to 270-M (e.g., one antenna per transceiver). The access terminal 120 may transmit data to the access point 110 on uplink and/or transmit the data to another access terminal (e.g., for peer-to-peer communication). The access terminal 120 also includes a controller 274 configured to control operations of the access terminal 120.

The transceivers 266-1 to 266-M receive and process (e.g., convert to analog, amplify, filter, and frequency up-convert) an output from the TX processor 264 for transmission via one or more of the antennas 270-1 to 270-M. For example, the transceiver 266 may up-convert the output from the TX processor 264 into a transmission signal having a frequency in a 60 GHz band. Accordingly, the antenna module described herein may be configured to perform a beamforming operation in the 60 GHz band, for example, in a band of about 57 to 63 GHZ. In addition, the antenna module may be configured to support MIMO transmission while performing beamforming in the 60 GHz band.

In relation to this, the antennas 270-1 to 270-M and the transceivers 266-1 to 266-M may be implemented in an integrated form on a multi-layer circuit substrate. To do so, among the antennas 270-1 to 270-M, an antenna configured to operate with vertical polarization may be vertically disposed inside the multi-layer circuit substrate.

To receive data, the access point 110 includes a reception (RX) processor 242 and an RX data processor 244. During operation, the transceivers 226-1 to 226-N receive a signal (e.g., from the access terminal 120) and spatially process (e.g., frequency down-convert, amplify, filter, and digitally convert) the received signal.

The RX processor 242 receives outputs from the transceivers 226-1 through 226-N and processes the outputs to recover data symbols. For example, the access point 110 may receive data from a frame (e.g., from the access terminal 120). In this example, the RX processor 242 may detect a start of the frame using a short training field (STF) sequence in a preamble of the frame. The RX processor 242 may also use the STF for automatic gain control (AGC) adjustment. The RX processor 242 may also perform channel estimation (e.g., using a channel estimation (CE) sequence in the preamble of the frame), and perform channel equalization on the received signal based on the channel estimation.

The RX data processor 244 receives data symbols from the RX processor 242 and an indication of a corresponding MSC scheme from the controller 234. The RX data processor 244 demodulates and decodes the data symbols, recovers the data according to the indicated MSC scheme, and stores and/or outputs the recovered data (e.g., data bits) to a data sink 246 for additional processing.

The access terminal 120 may transmit the data using an orthogonal frequency-division multiplexing (OFDM) transmission mode or a single-carrier (SC) transmission mode. In this case, the RX processor 242 may process the received signal according to a selected transmission mode. In addition, as described above, the TX processor 264 may support MIMO transmission. In this case, the access point 110 includes the antennas 230-1 to 230-N and the transceivers 226-1 to 226-N (e.g., one for each antenna). Accordingly, the antenna module described herein may be configured to perform a beamforming operation in the 60 GHz band, for example, in a band of about 57 to 63 GHz. In addition, the antenna module may be configured to support MIMO transmission while performing beamforming in the 60 GHz band.

In relation to this, the antennas 230-1 to 230-M and the transceivers 226-1 to 226-M may be implemented in an integrated form on a multi-layer circuit substrate. To do so, among the antennas 230-1 to 230-M, an antenna configured to operate with vertical polarization may be vertically disposed inside the multi-layer circuit substrate.

Meanwhile, each transceiver receives and processes (e.g., frequency down-converts, amplifies, filters, and digitally converts) a signal from each antenna. The RX processor 242 may perform spatial processing on the outputs from the transceivers 226-1 to 226-N to recover the data symbols.

The access point 110 also includes a memory 236 coupled to the controller 234. The memory 236 may store commands that, when executed by the controller 234, cause the controller 234 to perform one or more of the operations described herein. Similarly, the access terminal 120 also includes a memory 276 coupled to the controller 274. The memory 276 may store commands that, when executed by the controller 274, cause the controller 274 to perform one or more of the operations described herein.

Figure 3A:
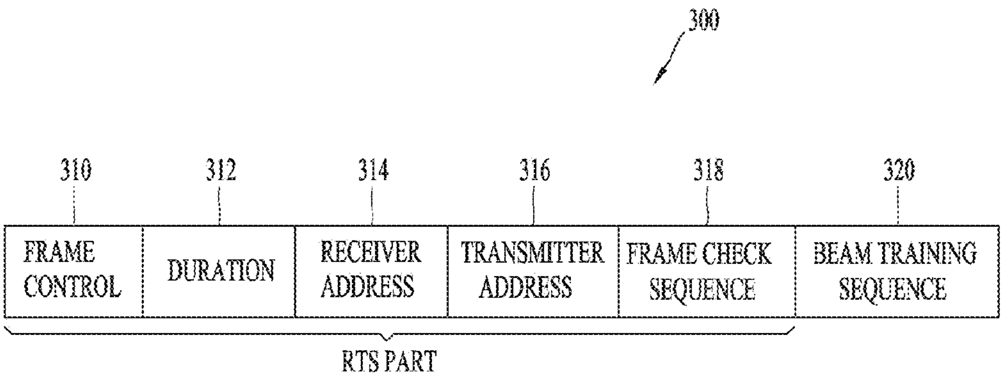
FIG. 3A shows a request to send (RTS) and a clear to send (CTS) according to the present disclosure.
Figure 3A:
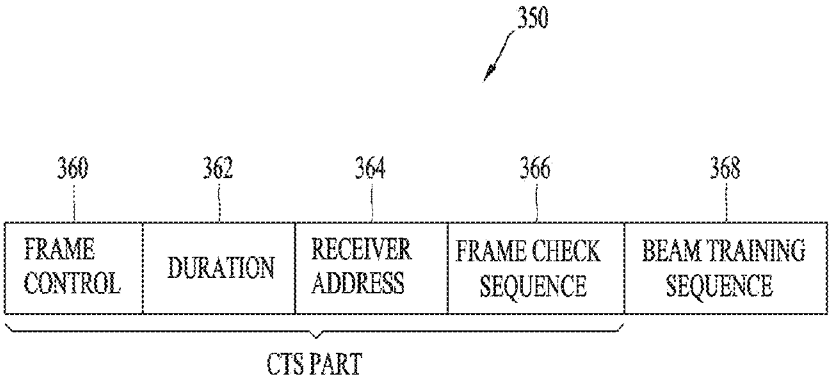

Meanwhile, an electronic device supporting 802.11ay wireless interface according to the present disclosure determines whether or not a communication medium is available to communicate with another electronic device. To this end, the electronic device transmits a Request to Send (RTS)-TRN frame including an RTS part and a first beam training sequence. In this regard, FIG. 3A shows a Request to Send (RTS) and a Clear to Send (CTS) according to the present disclosure. A transmitting device may use an RTS frame to determine whether a communication medium is available to transmit one or more data frames to a destination device. In response to the reception of the RTS frame, the destination device transmits a CTS frame to the transmitting device when the communication medium is available. In response to the reception of the CTS frame, the transmitting device transmits the one or more data frames to the destination device. In response to the successful reception of the one or more data frames, the destination device transmits one or more acknowledgment ("ACK") frames to the transmitting device.

Referring to (a) of FIG. 3A, a frame 300 includes an RTS part including a frame control field 310, a duration field 312, a receiver address field 314, a transmitter address field 316, and a frame check sequence field 318. For the purpose of improved communication and interference reduction, the frame 300 further includes a beam training sequence field 320 to configure antennas of a destination device and one or more neighboring devices, respectively.

Referring to (b) of FIG. 3A, a CTS frame 350 includes a CTS part including a frame control field 360, a duration field 362, a receiver address field 314, and a frame check sequence field 366. For the purpose of improved communication and interference reduction, the frame 350 further includes a beam training sequence field 368 to configure antennas of a transmitting device and one or more neighboring devices, respectively.

The beam training sequence fields 320 and 368 may comply with the training (TRN) sequence in accordance with IEEE 802.11ad or 802.11ay. The transmitting device may use the beam training sequence field 368 to configure its antenna for directional transmission to the destination device. On the other hand, the transmitting devices may use the beam training sequence field to configure their own antennas to reduce transmission interference at the destination device. In this case, the transmitting devices may use the beam training sequence field to configure their own antennas to generate antenna radiation patterns with nulls aimed at the destination device.

Figure 3B:
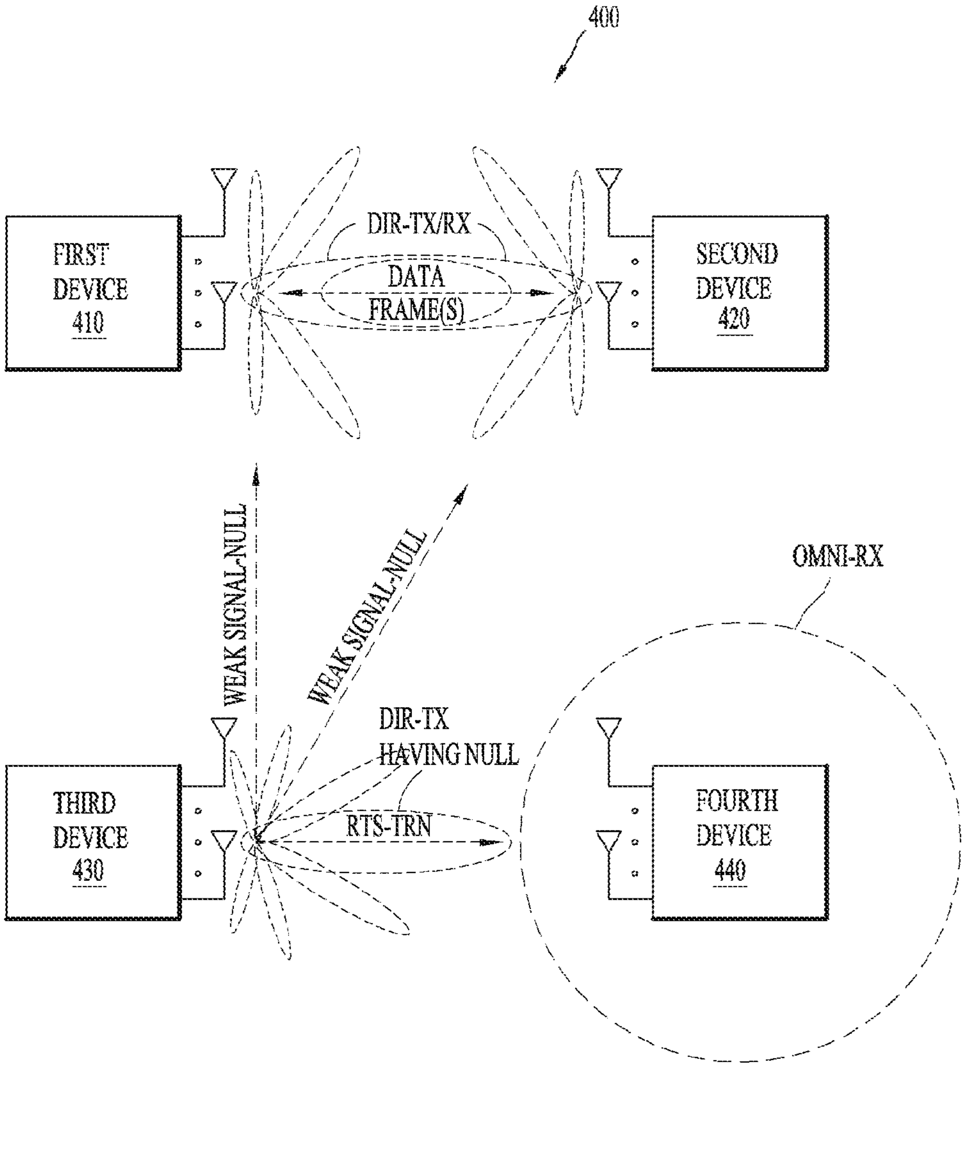
FIG. 3B is a block diagram illustrating a communication system 400 according to an example of the present disclosure.

Therefore, electronic devices supporting 802.11ay wireless interface may form initial beams to have a low interference level therebetween using beamforming patterns determined according to the beam training sequence. In this regard, FIG. 3B is a block diagram illustrating a communication system 400 according to an example of the present disclosure. As illustrated in FIG. 3B, first and second devices 410 and 420 may improve communication performance by matching directions of main beams. On the other hand, the first and second devices 410 and 420 may form signal-null having weak signal intensity in a specific direction, in order to reduce interference with a third device 430.

In relation to the formation of the main beam and the signal-null, a plurality of electronic devices according to the present disclosure may perform beamforming through array antennas. Referring to FIG. 3B, some of the plurality of electronic devices may alternatively be configured to perform communication with an array antenna of another electronic device through a single antenna. In this regard, when performing communication through the single antenna, a beam pattern is formed as an omnidirectional pattern.

Referring to FIG. 3B, the first to third devices 410 to 430 perform beamforming but a fourth device 440 does not perform beamforming, but the present disclosure is not limited thereto. Therefore, it may alternatively be configured such that three of the first to fourth devices 410 to 440 perform beamforming and the other may not perform beamforming.

As another example, it may be configured such that any one of the first to fourth devices 410 to 440 performs beamforming and the remaining three devices do not perform beamforming. As still another example, it may be configured such that two of the first to fourth devices 410 to 440 perform beamforming and the remaining two devices do not perform beamforming. As still another example, all the first to fourth devices 410 to 440 may be configured to perform beamforming.

Referring to FIGS. 3A and 3B, the first device 410 determines that it is an intended receiving device of the CTS-TRN frame 350 on the basis of an address displayed on the receiver address field 364 of the CTS-TRN frame 350. In response to the determination as the intended receiving device of the CTS-TRN frame 350, the first device 410 may use the beam training sequence of the beam training sequence field 368 of the received CTS-TRN 350 to configure its own antenna for a directional transmission substantially and selectively aimed at the second device 420. That is, the antenna of the first device 410 is configured to generate a primary lobe (e.g., highest gain lobe) substantially aimed at the second device 420, and an antenna radiation pattern with non-primary lobes aimed at other directions.

The second device 420 already knows the direction toward the first device 410 based on the beam training sequence of the beam training sequence field 320 of the previously-received RTS-TRN frame 300. Therefore, the second device 420 may configure its own antenna for a directional reception (e.g., primary antenna radiation lobe) selectively aimed at the first device 410. Therefore, while the antenna of the first device 410 is configured for the directional transmission toward the second device 420 and the antenna of the second device 420 is configured for the directional reception from the first device 410, the first device 410 transmits one or more data frames to the second device 420. Accordingly, the first and second devices 410 and 420 perform directional transmission/reception (DIR-TX/RX) of the one or more data frames through the primary lobe (main beam).

On the other hand, the first and second devices 410 and 420 may partially modify the beam pattern of the third device 430 to reduce interference with the third device 430 due to an antenna radiation pattern with the non-primary lobes.

In this regard, the third device 430 determines that it is not an intended receiving device of the CTS-TRN frame 350 on the basis of an address indicated in the receiver address field 364 of the CTS-TRN frame 350. In response to the determination that it is not the intended receiving device of the CTS-TRN frame 350, the third device 430 uses the beam training sequence of the beam training sequence field 368 of the received CTS-TRN 350 and the sequence of the beam training sequence field 320 of the previously-received RTS-TRN frame 300, in order to configure its antenna to generate antenna radiation patterns each with nulls substantially aimed at the second device 420 and the first device 410. The nulls may be based on estimated arrival angles of the previously-received TRS-TRN frame 300 and CTS-TRN frame 350. In general, the third device 430 generates antenna radiation patterns with desired signal power, refusals, or gains aimed at the first device 410 and the second device 420 such that estimated interferences at the devices 410 and 420 are equal to or lower than a defined threshold value (e.g., to achieve a desired bit error rate (BER), signal-to-noise ratio (SNR), signal-to-interference ratio (SINR), and/or other one or more communication attributes).

The third device 430 may configure its antenna transmission radiation pattern by estimating antenna gains in directions toward the first and second devices 410 and 420, estimating antenna mutuality differences (e.g., transmitting antenna gain-receiving antenna gain) between the third device 430 and the first and second devices 410 and 420, and calculating those values over one or more sectors for determining corresponding estimated interferences at the first and second devices 410 and 420.

The third device 430 transmits the RTS-TRN frame 300 intended for the fourth device 440, which the fourth device 440 receives. The third device 430 maintains an antenna configuration with nulls aimed at the first and second devices 410 and 420 as long as the first device 410 and the second device 420 are communicating based on durations displayed on the duration fields 312 and 362 of the RTS-TRN frame 300 and the CTS-TRN frame 350, respectively. As the antenna of the third device 430 is configured to produce the nulls aimed at the first device 410 and the second device 420, the transmission of the RTS-TRN frame 300 by the third device 430 may produce reduced interferences at the first device 410 and the second device 420.

Therefore, electronic devices supporting the 802.11ay wireless interface disclosed herein can form a signal-null to a specific direction for interference reduction while matching a main beam direction therebetween using array antennas. To this end, the plurality of electronic devices may form an initial beam direction through a beam training sequence, and change the beam direction through the periodically updated beam training sequence.

As aforementioned, the beam directions should be matched between the electronic devices for high-speed data communication between the electronic devices. Also, the loss of wireless signals transmitted to an antenna element should be minimized for the high-speed data communication. To this end, the array antenna should be disposed inside a multi-layer substrate on which an RFIC is disposed. Also, the array antenna is necessarily disposed adjacent to a side region inside the multi-layer substrate for radiation efficiency.

In addition, the beam training sequence should be updated to adapt to the change of a wireless environment. To update the beam training sequence, the RFIC should periodically transmit and receive signals to and from a processor such as a modem. Therefore, control signal transmission and reception between the RFIC and the modem should also be carried out within fast time to minimize an update delay time. To this end, a physical length of a connection path between the RFIC and the modem should be reduced. To this end, the modem may be disposed on the multi-layer substrate on which the array antenna and the RFIC are disposed. Or, in the structure that the array antenna and the RFIC are disposed on the multi-layer substrate and the modem is disposed on a main substrate, the connection length between the RFIC and the modem may be minimized. A detailed structure thereof will be described later with reference to FIG. 5C.

Figure 4:
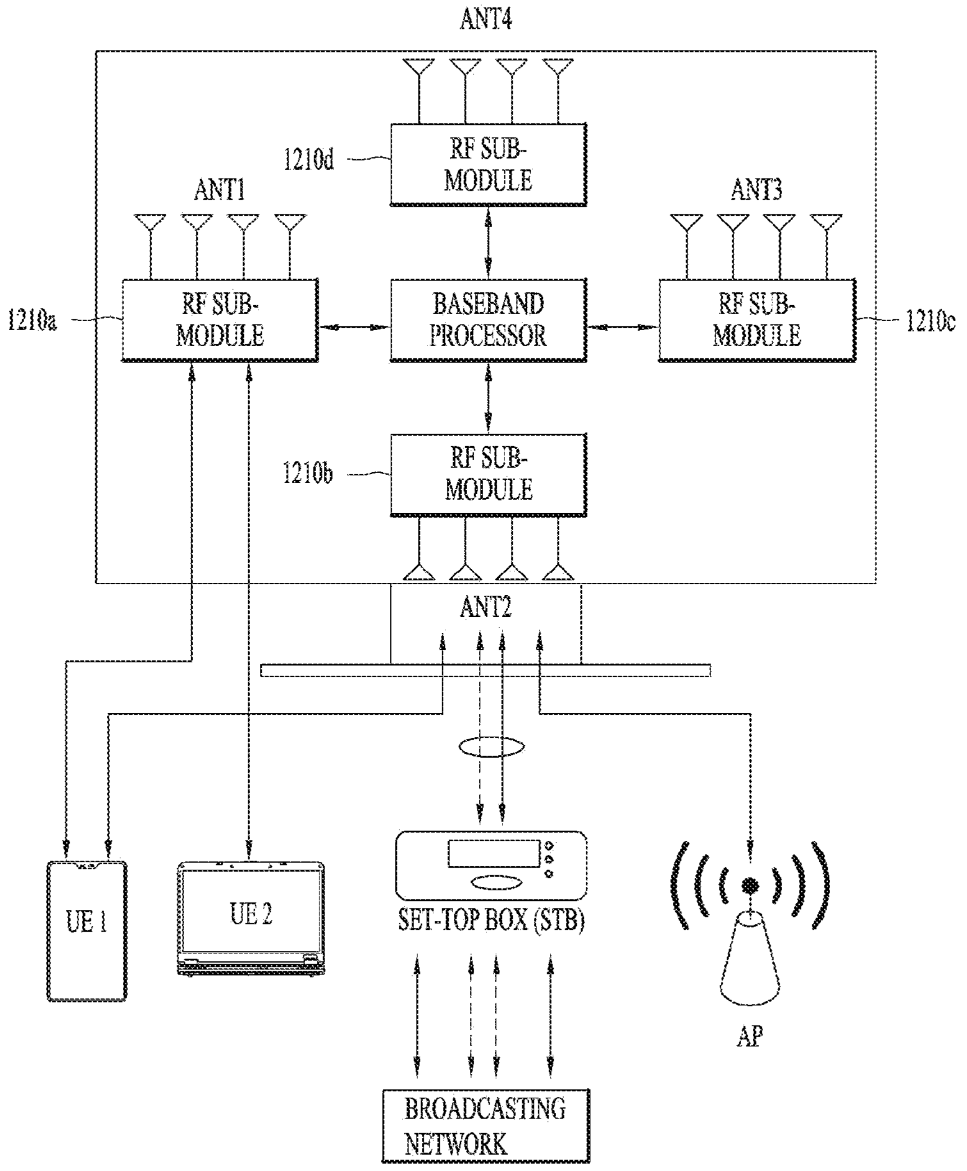
FIG. 4 is a diagram showing an electronic device including a plurality of antenna modules and a plurality of transceiver circuit modules in accordance with one embodiment.

Hereinafter, an electronic device having an array antenna that can operate in an mmWave band will be described. In this regard, FIG. 4 is a diagram showing an electronic device including a plurality of antenna modules and a plurality of transceiver circuit modules in accordance with one embodiment. Referring to FIG. 4, a home appliance in which a plurality of antenna modules and a plurality of transceiver circuit modules are disposed may be a television, but is not limited thereto. Therefore, the home appliance having the plurality of antenna modules and the plurality of transceiver circuit modules disclosed herein may include an arbitrary home appliance or display device that supports a communication service in a millimeter wave band.

Referring to FIG. 4, the electronic device 1000 includes a plurality of antenna modules ANT1 to ANT4 and a plurality of transceiver circuit modules 1210*a* to 1210*d*. In this regard, the plurality of transceiver circuit modules 1210*a* to 1210*d* may correspond to the aforementioned transceiver circuit 1250. Or, the plurality of transceiver circuit modules 1210*a* to 1210*d* may be a partial configuration of the transceiver circuit 1250 or a partial configuration of a front end module disposed between the antenna module and the transceiver circuit 1250.

The plurality of antenna modules ANT1 to ANT4 may be configured as array antennas with a plurality of antenna elements. The number of elements of each antenna module ANT1 to ANT4 may be two, three, four, and the like as aforementioned, but it not limited thereto. For example, the number of antenna modules ANT1 to ANT4 may be expanded to two, four, eight, sixteen, and the like. Also, the elements of the antenna modules ANT1 to ANT4 may be selected by the same number or different numbers. The plurality of antenna modules ANT1 to ANT4 may be disposed on different regions of the display or on a bottom or side surface of the electronic device. The plurality of antenna modules ANT1 to ANT4 may be disposed on top, left, bottom, and right sides of the display, but the present disclosure is not limited thereto. As another example, the plurality of antenna modules ANT1 to ANT4 may alternatively be disposed on a left top portion, a right top portion, a left bottom portion, and a right bottom portion of the display.

The antenna modules ANT1 to ANT4 may be configured to transmit and receive signals at an arbitrary frequency band in a specific direction. For example, the antenna modules ANT1 to ANT4 may operate at one of 28 GHz band, 39 GHz band, and 64 GHz band.

The electronic device may maintain a connection state with different entities through two or more of the antenna modules ANT1 to ANT4 or perform data transmission or reception therefor. In this regard, the electronic device corresponding to the display device may transmit or receive data to or from a first entity through the first antenna module ANT1. The electronic device may transmit or receive data to or from a second entity through the second antenna module ANT2. As one example, the electronic device may transmit or receive data to or from a mobile terminal (User Equipment (UE)) through the first antenna module ANT1. The electronic device may transmit or receive data to or from a control device such as a set-top box or access point (AP) through the second antenna module ANT2.

The electronic device may transmit or receive data to or from other entities through the other antenna modules, for example, the third antenna module ANT3 and the fourth antenna module ANT4. As another example, the electronic device may perform dual connectivity or MIMO with at least one of previously-connected first and second entities through the third antenna module ANT3 and the fourth antenna module ANT4.

The mobile terminals UE1 and UE2 may be disposed on a front region of the electronic device to communicate with the first antenna module ANT1. On the other hand, the set-top box STB or the AP may be disposed on a bottom region of the electronic device to communicate with the second antenna module ANT2 but is not limited thereto. As another example, the second antenna module ANT2 may include a first antenna radiating a signal to the lower region, and a second antenna radiating a signal to a front region. Therefore, the second antenna module ANT2 may perform communication with the set-top box STB or the AP through the first antenna, and perform communication with one of the mobile terminals UE1 and UE2 through the second antenna.

Meanwhile, one of the mobile terminals UE1 and UE2 may be configured to perform MIMO with the electronic device. As one example, the UE1 may be configured to perform MIMO while performing beamforming with the electronic device. As aforementioned, the electronic device corresponding to the image display device may perform high-speed communication with another electronic device or set-top box through a WiFi wireless interface. As one example, the electronic device may perform high-speed communication with another electronic device or set-top box at 60 GHz through 802.11ay wireless interface.

In the meantime, the transceiver circuit modules 1210*a* to 1210*d* may operate to process transmission signals and reception signals at RF frequency bands. Here, the RF frequency bands, as aforementioned, may be arbitrary mm Wave frequency bands, such as 28 GHZ, 39 GHz, and 64 GHz. The transceiver circuit modules 1210*a* to 1210*d* may be referred to as RF sub-modules 1210*a* to 1210*d*. At this time, the number of RF sub-modules 1210*a* to 1210*d* may not be limited to four, but may vary to an arbitrary number more than two depending on an application.

Also, the RF sub-modules 1210*a* to 1210*d* may include an up-conversion module and a down-conversion module that convert a signal of an RF frequency band into a signal of an IF frequency band or a signal of an IF frequency band into a signal of an RF frequency band. To this end, the up-conversion module and the down-conversion module may include a local oscillator (LO) that can perform up-frequency conversion and down-frequency conversion.

The plurality of RF sub-modules 1210*a* to 1210*d* may be configured such that a signal is transmitted from one of the plurality of transceiver circuit modules to an adjacent transceiver circuit module. Accordingly, the transmitted signal can be transmitted at least one time to all of the plurality of transceiver circuit modules 1210*a* to 1210*d*.

To this end, a data transfer path in a loop structure may be additionally provided. In this regard, the adjacent RF sub-modules 1210*b* and 1210*c* may be allowed to perform a bi-directional signal transfer through a transfer path P2 with the loop structure.

Or, a data transfer path in a feedback structure may be additionally provided. In this regard, at least one RF sub-module 1210*c* is allowed to perform a uni-directional signal transfer to the other RF sub-modules 1210*a*, 1210*b*, and 1210*c* through the data transfer path with the feedback structure.

The plurality of RF sub-modules may include a first RF sub-module to a fourth RF sub-module 1210*a* to 1210*d*. In this regard, a signal may be transferred from the first RF sub-module 1210*a* to the adjacent second RF sub-module 1210*b* and fourth RF sub-module 1210*d*. Also, the second RF sub-module 1210*b* and the fourth RF sub-module 1210*d* may transfer the signal to the third RF sub-module 1210*c*. At this time, when the second RF sub-module 1210*b* and the third RF sub-module 1210*c* are available to transmit signals bidirectionally, it may be referred to as the loop structure. On the other hand, when the second RF sub-module 1210*b* and the third RF sub-module 1210*c* are available to merely transmit signals unidirectionally, it may be referred to as the feedback structure. In the feedback structure, at least two signals may be transferred to the third RF sub-module 1210*c*.

However, with no limit to this, the baseband module may be disposed in a specific module of the first to fourth RF sub-modules 1210*a* to 1210*d* depending on applications. Or, depending on applications, the baseband module may not be disposed in the first to fourth RF sub-modules 1210*a* to 1210*d*, but may be configured as a separate controller, namely, a baseband processor 1400. For example, a control signal transfer may alternatively be carried out only by the separate controller, namely, the baseband processor 1400.

Hereinafter, a description will be given of detailed configuration and functions of the electronic device as illustrated in FIG. 1, having wireless interfaces as illustrated in FIG. 2. Electronic devices are needed to transmit or receive data therebetween using communication services in an mm Wave band. In this regard, wireless audio-video (AV) service and/or high-speed data transmission may be provided by using 802.11ay wireless interface as the mmWave wireless interface. In this case, the mmWave wireless interface is not limited to the 802.11ay wireless interface, but an arbitrary wireless interface of 60 GHz may be applied. In this regard, a 5G or 6G wireless interface that uses 28 GHz band or 60 GHz band may alternatively be used for high-speed data transmission between electronic devices.

There is no detailed solution to antenna and radio frequency integrated chip (RFIC) providing a wireless interface in an electronic device such as an image display device for transferring images with resolution over 4K. Specifically, considering a situation that the electronic device such as the image display device is disposed on a wall of a building or a table, the electronic device is needed to transmit or receive wireless AV data to or from another electronic device. To this end, a detailed configuration and antenna structure for determining a region of the image display device to dispose the antenna and RFIC should be proposed.

Figure 5A:
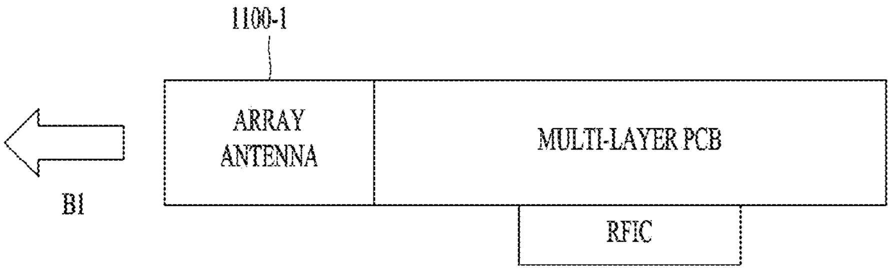
FIG. 5A shows a configuration, in which a multi-layered circuit board having an array antenna module thereon is connected to an RFIC, in relation to the present disclosure.
Figure 5A:
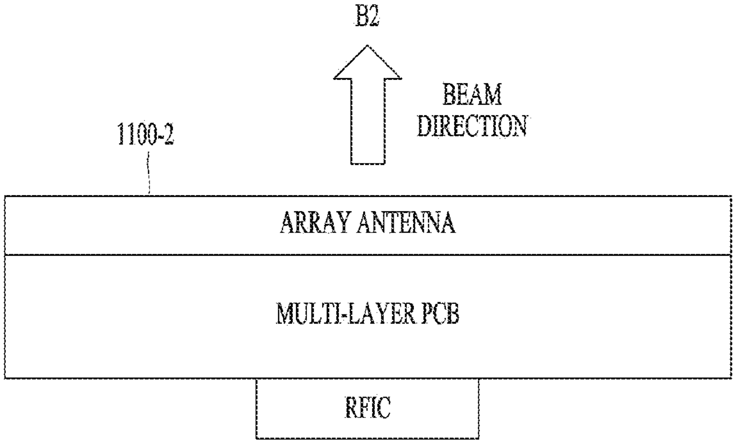

In this regard, FIG. 5A shows a configuration, in which a multi-layered circuit board having an array antenna module thereon is connected to an RFIC, in relation to the present disclosure. In detail, FIG. 5A shows an antenna in package (AIP) module structure and an antenna module structure implemented on a flexible substrate, in relation to the present disclosure.

Referring to (a) of FIG. 5A, the AIP module is disposed for mmWave band communication, and configured as an integral form of RFIC-PCB-antenna. In this regard, an array antenna module 1100-1, as illustrated in (a) of FIG. 5, may be integrally disposed with a multi-layer substrate. Therefore, the array antenna module 1100-1 that is integrally disposed with the multi-layer substrate may be referred to as an AIP module. In detail, the array antenna module 1100-1 may be disposed in one region of the multi-layer substrate. In this regard, a first beam B1 may be formed toward a side region of the multi-layer substrate by using the array antenna module 1100-1 disposed in the one region of the multi-layer substrate.

On the other hand, referring to (b) of FIG. 5A, an array antenna module 1100-2 may be disposed on the multi-layer substrate. The disposition of the array antenna module 1100-2 is not limited to the structure of (b) of FIG. 5A, but may alternatively be disposed on an arbitrary layer inside the multi-layer substrate. Accordingly, a second beam B2 may be formed toward a front region of the multi-layer substrate by using the array antenna module 1100-2 disposed on the arbitrary layer of the multi-layer substrate. The AIP module integrally formed with the array antenna module may be configured such that an array antenna is disposed on the same PCB to minimize a distance between the RFIC and the antenna.

On the other hand, the antenna of the AIP module may be produced through a multi-layered PCBA manufacturing process, and may radiate a signal in a vertical/side direction of the PCB. In this regard, dual polarization may be realized by using a patch antenna, a dipole/monopole antenna, or the like. Therefore, the first array antenna 1100-1 of (a) of FIG. 5A may be disposed on the side region of the multi-layer substrate and the second array antenna 1100-2 of (b) of FIG. 5A may be disposed on the side region of the multi-layer substrate. Accordingly, the first beam B1 may be generated through the first array antenna 1100-1 and the second beam B2 may be generated through the second array antenna 1100-2.

The first array antenna 1100-1 and the second array antenna 1100-2 may be configured to have the same polarization. Or, the first array antenna 1100-1 and the second array antenna 1100-2 may be configured to have polarizations orthogonal to each other. In this regard, the first array antenna 1100-1 may operate as a vertically polarized antenna and the second array antenna 1100-2 may operate as a horizontally polarized antenna. As one example, the first array antenna 1100-1 may be a monopole antenna having the vertical polarization and the second array antenna may be a patch antenna having the horizontal polarization.

Figure 5B:
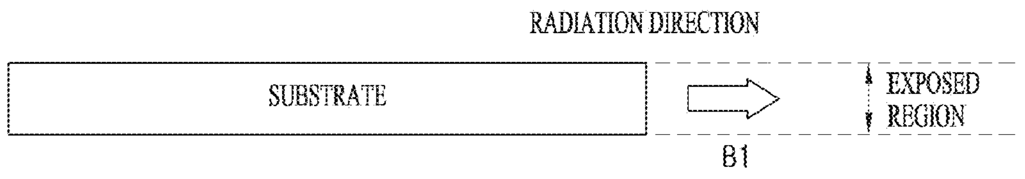
FIG. 5B is a conceptual view showing antenna structures having different radiation directions.
Figure 5B:
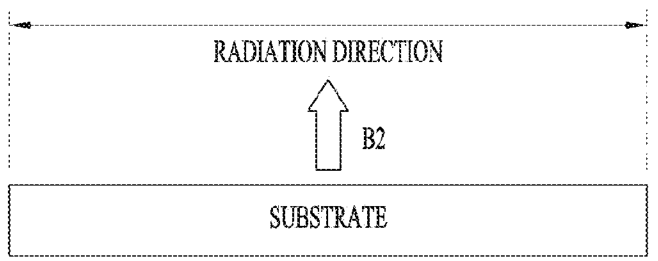

On the other hand, FIG. 5B is a conceptual view showing antenna structures having different radiation directions.

Referring to (a) of FIG. 5A and (a) of FIG. 5B, a radiation direction of an antenna module disposed on the side region of the multi-layer substrate corresponds to a lateral (side) direction. In relation, an antenna implemented on a flexible substrate may be configured as radiation elements such as dipole/monopole antennas. That is, the antenna implemented on the flexible substrate may include end-fire antenna elements.

End-fire radiation may be implemented by an antenna that radiates a signal in a horizontal direction with respect to a substrate. The end-fire antenna may be implemented by a dipole/monopole antenna, a Yagi dipole antenna, a Vivaldi antenna, a SIW horn antenna, and the like. Here, the Yagi-dipole antenna and the Vivaldi antenna have horizontal polarization characteristics. Meanwhile, one of antenna modules disposed on the image display device disclosed herein needs a vertically polarized antenna. Therefore, there is a need of proposing an antenna structure capable of minimizing an exposed portion of an antenna while operating as a vertically polarized antenna.

Referring to (b) of FIG. 5A and (a) of FIG. 5B, a radiation direction of an antenna module disposed on the front region of the multi-layer substrate corresponds to a front direction. In relation, an antenna disposed on the AIP module may be configured as radiation elements such as patch antennas. That is, the antenna disposed on the AIP module may include broadside antenna elements that radiate in a broadside direction.

Figure 5C:
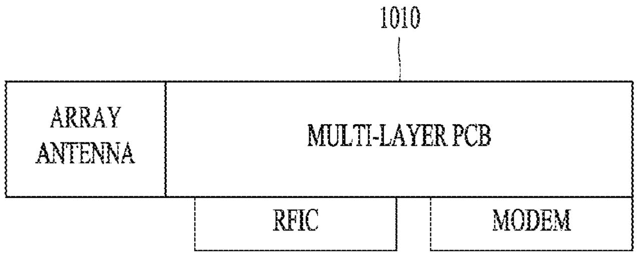
FIG. 5C shows coupling structures between a multi-layer substrate and a main substrate in accordance with embodiments.
Figure 5C:
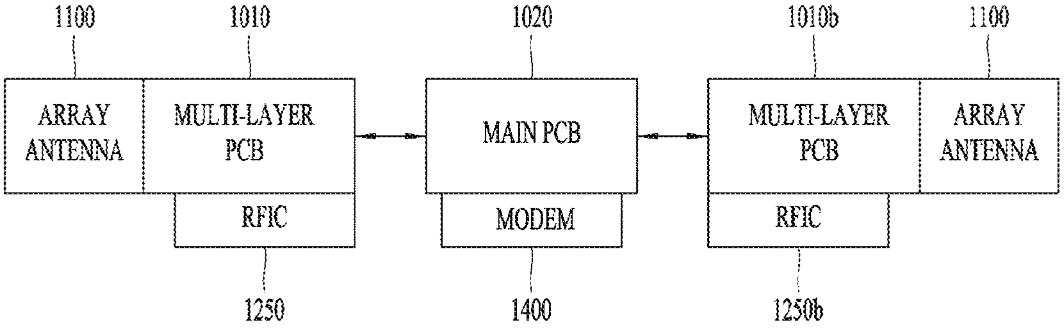

In the meantime, a multi-layer substrate having an array antenna disposed therein may be integrally formed with a main substrate or may be modularly coupled to the main substrate by a connector. In this regard, FIG. 5C shows coupling structures between a multi-layer substrate and a main substrate in accordance with embodiments. Referring to (a) of FIG. 5C, a structure in which the RFIC 1250 and the modem 1400 are integrally formed on the multi-layer substrate 1010 is shown. The modem 1400 may be referred to as a baseband processor 1400. Therefore, the multi-layer substrate 1010 may be integrally formed with the main substrate. The integral structure may be applied to a structure in which only one array antenna module is disposed in an electronic device.

On the other hand, the multi-layer substrate 1010 and the main substrate 1020 may be modularly coupled to each other by a connector. Referring to (b) of FIG. 5C, the multi-layer substrate 1010 may be interfaced with the main substrate 1020 through the connector. In this case, the RFIC 1250 may be disposed on the multi-layer substrate 1010 and the modem 1400 may be disposed on the main substrate 1020. Accordingly, the multi-layer substrate 1010 may be produced as a separate substrate from the main substrate 1020 and coupled to the main substrate 1020 through the connector.

The modular structure may be applied to a structure in which a plurality of array antenna modules are disposed in an electronic device. Referring to (b) of FIG. 5C, the multi-layer substrate 1010 and a second multi-layer substrate 1010*b* may be interfaced with the main substrate 1020 through connectors. The modem 1400 disposed on the main substrate 1020 may be electrically coupled to RFICs 1250 and 1250*b* disposed on the multi-layer substrate 1010 and the second multi-layer substrate 1010*b*.

Figure 6:
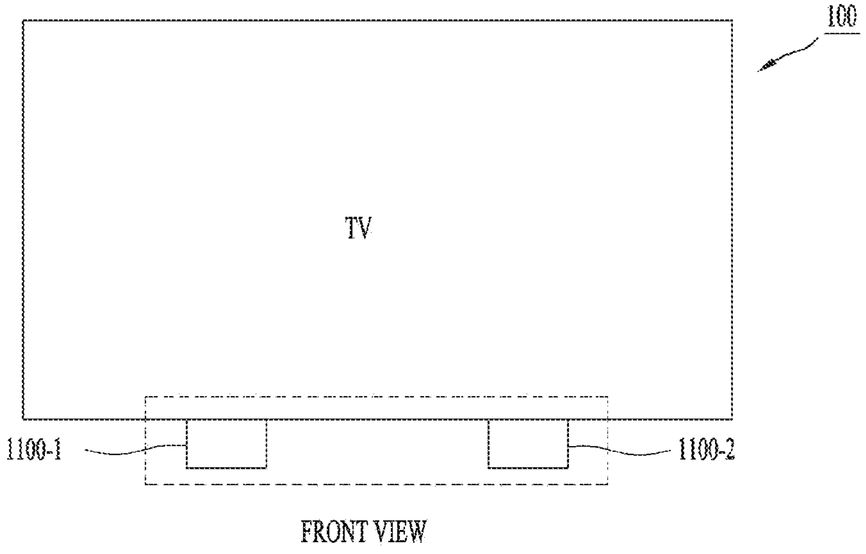
FIG. 6 is a conceptual view illustrating communications with a plurality of communication modules disposed on a lower portion of an image display device and another communication module disposed in a front direction of the image display device.
Figure 6:
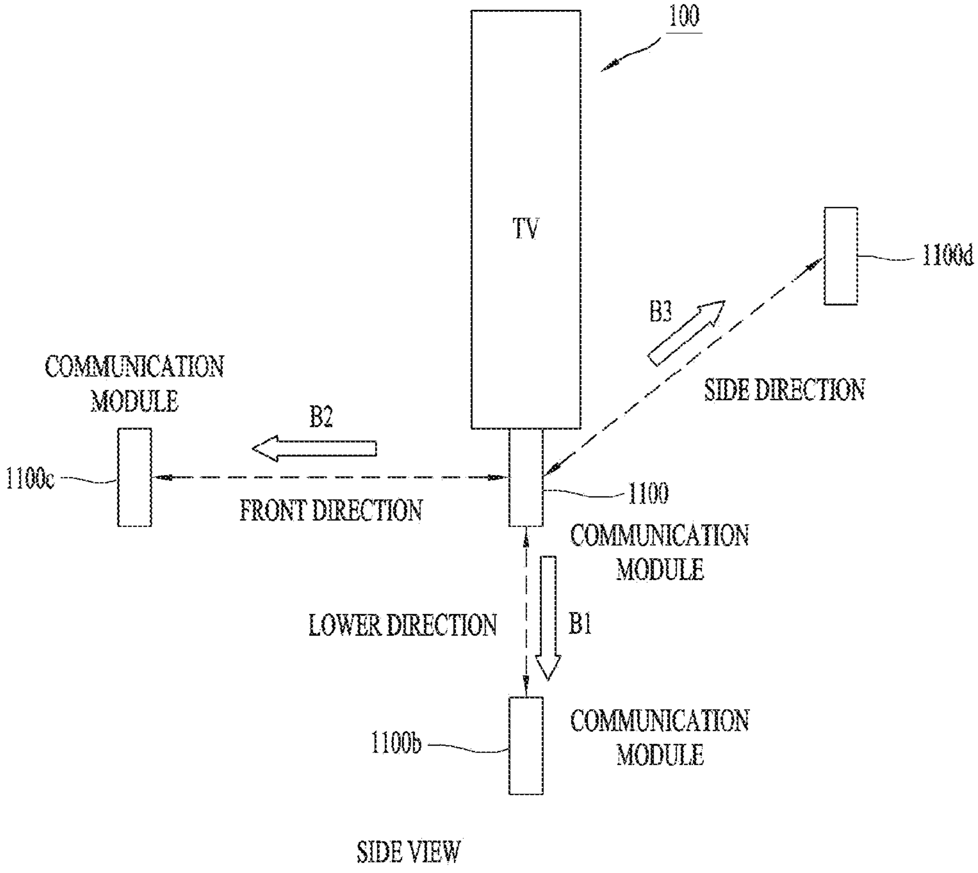

Meanwhile, when the AIP module is disposed beneath the electronic device such as the image display device, it is necessary to communicate with other communication modules disposed in a lower direction and a front direction. In this regard, FIG. 6 is a conceptual view illustrating a plurality of communication modules disposed on a lower portion of an image display device, and communications carried out between the corresponding communication modules and another communication module disposed in a front direction of the image display device. Referring to (a) of FIG. 6, different communication modules 1100-1 and 1100-2 may be disposed on the lower portion of the image display device 100. Referring to (b) of FIG. 6, the image display device 100 may perform communication with a communication module 1100*b* disposed therebelow through an antenna module 1100. Also, the image display device 100 may perform communication with a second communication module 1100*c* disposed at the front thereof through the antenna module 1100. Also, the image display device 100 may perform communication with a second communication module 1100*d* disposed at the side surface thereof through the antenna module 1100.

Here, the communication module 1100*b* may be a set-top box or AP that transfers AV data to the image display device 100 at high speed through the 802.11ay wireless interface, but is not limited thereto. Also, the second communication module 1100*c* may be an arbitrary electronic device that transmits and receives data at high speed to and from the image display device 100 through the 802.11ay wireless interface. Meanwhile, to perform wireless communication with communication modules 1100*b*, 1100*c*, and 1100*d* disposed on front, lower, and side surfaces, the antenna module 1100 having a plurality of array antennas forms beams in different directions. Specifically, the antenna module 1100 may form beams in a front direction B1, a lower direction B2, and a side direction B3 through different array antennas.

Meanwhile, an antenna height may increase according to an RFIC driving circuit and a heat dissipation structure in the AIP module structure as illustrated in (a) of FIG. 5A. Also, the antenna height may increase in the AIP module structure as illustrated in (a) of FIG. 5A according to an antenna type used. On the other hand, the antenna module structure implemented on the side region of the multi-layer substrate as illustrated in (b) of FIG. 5A may be implemented as a low-profile type.

Hereinafter, a description will be given of a detailed configuration of the antenna module of FIGS. 5A and 5B to be disposed inside or on a side surface of the electronic device of FIGS. 4 and 6 in the configuration, as illustrated in FIGS. 3A and 3B, in the electronic device as illustrated in FIGS. 1 and 2.

An electronic device such as an image display device may include a communication module having antennas to perform communications with neighboring electronic devices. Meanwhile, as a display area (region) of an image display device is expanded recently, a disposition space of a communication module including antennas is reduced. This causes an increase in necessity of disposing antennas inside a multi-layered circuit board on which the communication module is implemented.

A WiFi wireless interface may be considered as an interface for a communication service between electronic devices. When using such a WiFi wireless interface, a millimeter wave (mmWave) band may be used for high-speed data transmission between the electronic devices. In particular, the high-speed data transmission between the electronic devices is achieved using a wireless interface such as 802.11ay.

In this regard, an array antenna that can operate in a millimeter wave (mmWave) band may be mounted in an antenna module. However, an antenna disposed in the antenna module and an electronic component such as a transceiver circuit are electrically connected to each other. To this end, the transceiver circuit may be operably coupled to the antenna module and the antenna module may be configured in the form of a multi-layer substrate.

In this regard, the radiation pattern of a signal radiated from the antenna module may radiate in a vertical direction of the multi-layer substrate. Meanwhile, there is a problem in that communication disconnection may occur when there is an obstacle on a communication path when communicating between electronic devices disposed with such antenna modules. In this regard, as the radiation pattern of the signal radiated from the antenna module is disposed in a direction perpendicular to the multi-layer substrate, communication disconnection occurs on a communication path in which there is an obstacle.

The present disclosure is directed to solving the aforementioned problems and other drawbacks. Another aspect of the present disclosure is to provide a broadband antenna module operating in a millimeter wave (mm Wave) band and an electronic device including the same.

Still another aspect of the present disclosure is to change a direction of a signal radiated from an antenna element operating in a millimeter wave band.

Yet still another aspect of the present disclosure to change a direction of a signal radiated from an antenna element operating in a millimeter wave band so as to prevent communication disconnection even when there is an obstacle on a communication path.

Still yet another aspect of the present disclosure is to allow a radiation pattern of a signal radiated from an antenna element to be tilted by a predetermined angle from a vertical direction without beamforming.

Yet still another aspect of the present disclosure is to allow a radiation pattern of a signal radiated from an antenna element to be tilted by a predetermined angle from a vertical direction without disposing an antenna module at an angle.

Figure 7A:
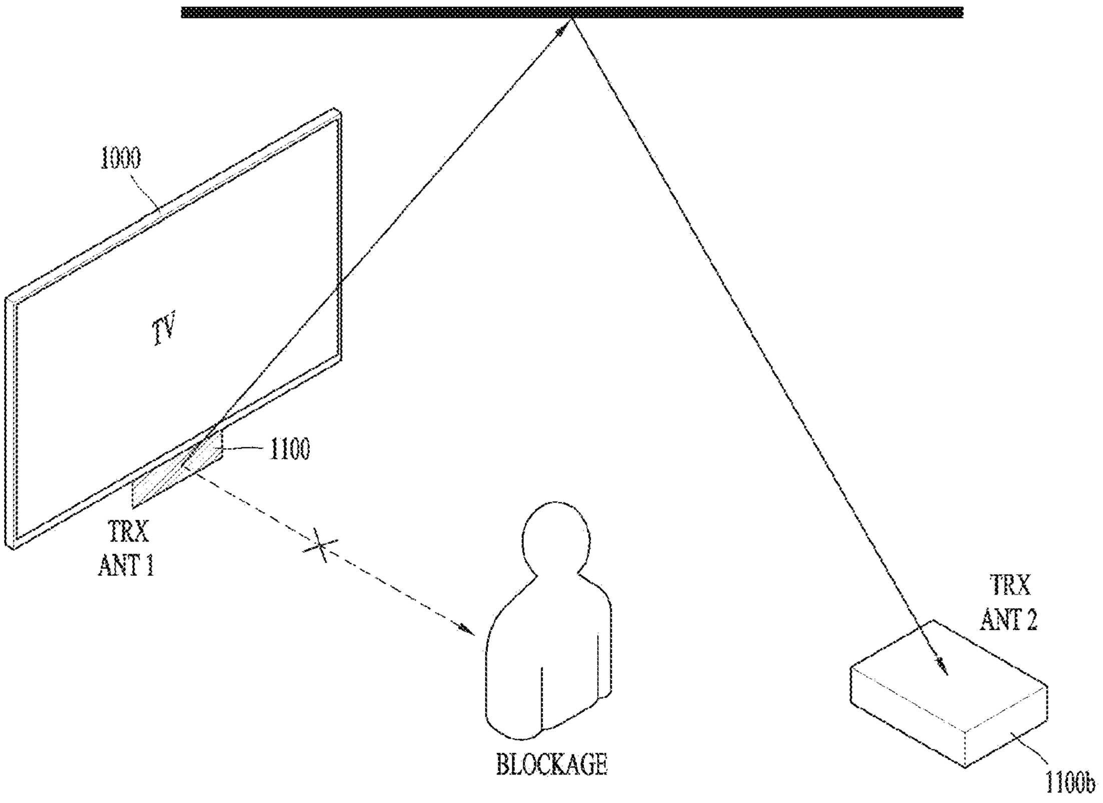
FIG. 7A is a conceptual view related to a communication method in the event of radio interference between an antenna module disposed in a lower region of an electronic device according to the present disclosure and a second antenna module that may be disposed in another electronic device.

An antenna module having an antenna element in which a beam pattern according to the present disclosure is formed at an angle, and an electronic device including the same will be described. In this regard, FIG. 7A is a conceptual view related to a communication method in the event of radio interference between an antenna module disposed in a lower region of an electronic device according to the present disclosure and a second antenna module that may be disposed in another electronic device. Meanwhile, FIG. 7B is a conceptual view showing a main beam direction of the antenna module in which a beam pattern according to the present disclosure is formed at an angle.

Referring to FIG. 7A, radio interference or signal reception performance deterioration may occur due to an obstacle between an antenna module 1100 disposed in a lower region of an electronic device and a second antenna module 1100*b* that may be disposed in another electronic device.

In this regard, when watching high-definition video wirelessly on an electronic device, ultra-high-speed data transmission technology may be used by using a frequency of 60 GHz as in the IEEE 802.11ay standard. Electromagnetic waves such as 30/60 GHz mmWave have strong straightness characteristics, and thus cannot pass through or bypass an obstacle such as a person or an object using diffraction. Therefore, communication between the electronic device and other communication device (e.g., set-top box) may be cut off to disallow efficient viewing. In order to solve this problem, an electronic device may communicate with a set-top box by reflecting electromagnetic waves using an indoor ceiling. Therefore, the patch antenna, which is a representative mm Wave antenna element, needs to have directivity not only in a forward direction, but also in an upward direction toward the ceiling.

Figure 7B:
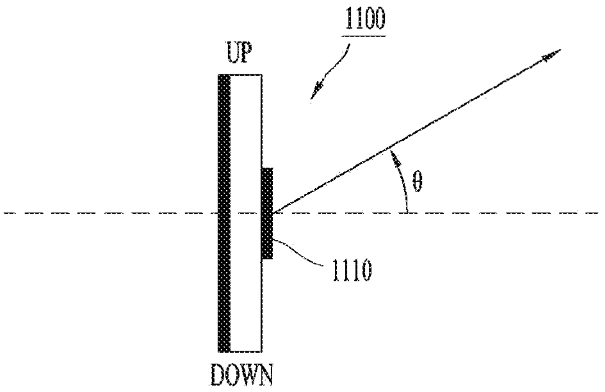
FIG. 7B is a conceptual view showing a main beam direction of the antenna module in which a beam pattern according to the present disclosure is formed at an angle.

Referring to FIGS. 7A and 7B, a patch antenna element 1110 of the antenna module 1100 may be disposed to face toward the front of the electronic device. Meanwhile, a beam pattern direction of the antenna element 1110 needs to be configured to face in an upward direction toward the sky direction with respect to a reference line. In this regard, as a coverage region due to electromagnetic waves radiated from the antenna element 1110 increases, the communicable region increases. Therefore, a beam peak direction must be formed in an upward direction at a predetermined angle (θ) without physically tilting the antenna element. In this regard, when the antenna element is physically disposed at an angle, problems in disposing the antenna module and deformation of the exterior design of the electronic device may occur.

Figure 8A:
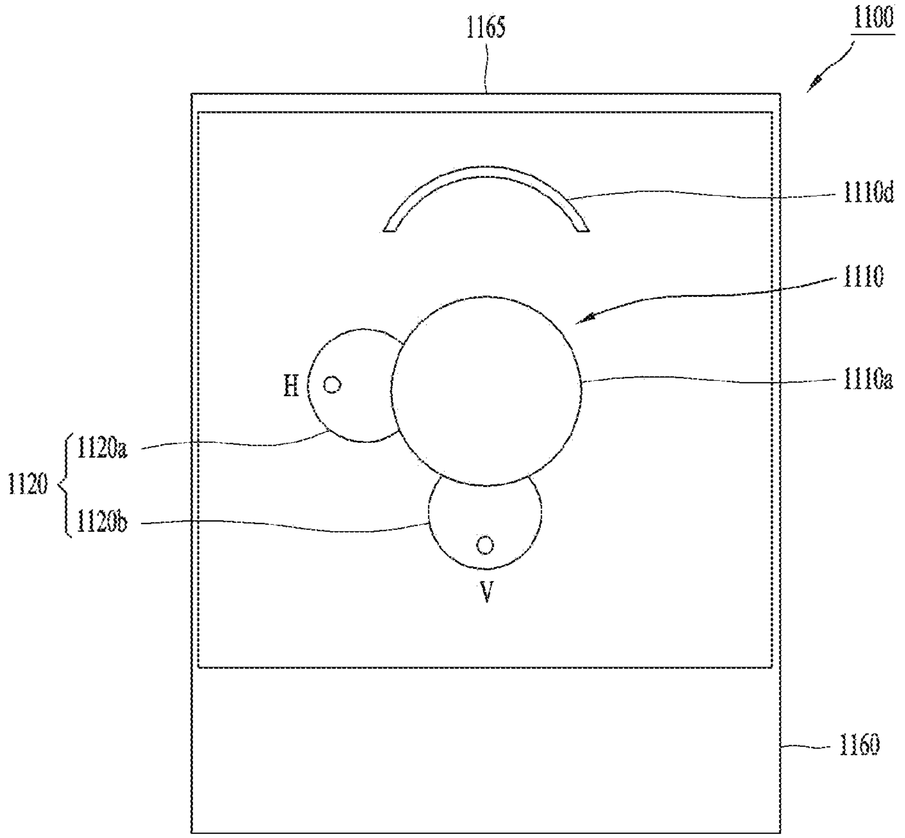
FIG. 8A shows a front view of a multi-layer substrate on which an antenna element formed within a ground wall having an inclined multi-layer ground structure according to the present disclosure is disposed. Meanwhile.

As described above, in order to implement an antenna capable of tilting the beam peak direction in a vertical direction, the antenna structure according to the present disclosure will be described in detail with reference to the drawings. In this regard, FIG. 8A shows a front view of a multi-layer substrate on which an antenna element formed within a ground wall having an inclined multi-layer ground structure according to the present disclosure is disposed. Meanwhile, FIG. 8B shows a side view of the multi-layer substrate having the multi-layer ground structure of FIG. 8A.

Figure 8B:
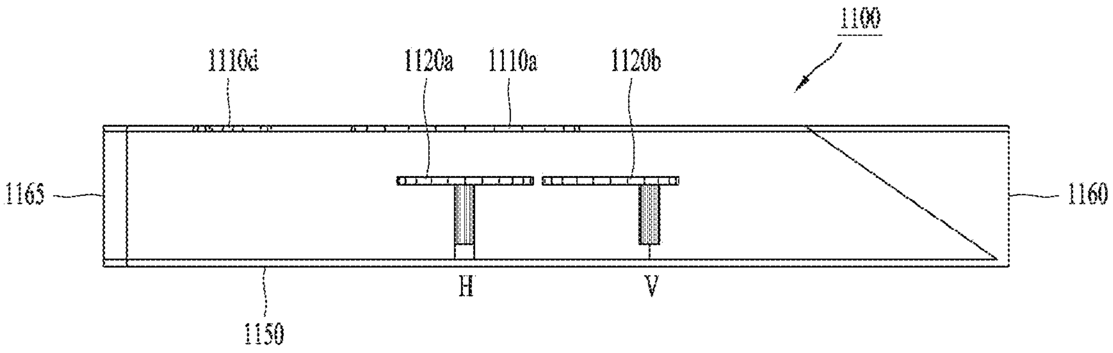
FIG. 8B shows a side view of the multi-layer substrate having the multi-layer ground structure of FIG. 8A.

Referring to FIGS. 8A and 8B, the antenna module 1100 implemented with a multi-layer substrate according to the present disclosure may include a radiator 1110, a feed structure 1120, a lower ground layer 1150, and a multi-layer ground structure 1160.

The radiator 1110 may be disposed on an inner region or upper region of the multi-layer substrate. The radiator 1110 may be disposed to have at least one conductive layer to radiate a wireless signal. The feed structure 1120 may be configured through a signal via disposed in a lower region of the radiator 1110. The feed structure 1120 may be configured to transmit a signal to the radiator 1110.

As shown in FIGS. 8A and 8B, the feed structure 1120 may be disposed in a lower layer of the radiator 1110 such that a wireless signal is coupled to the radiator 1110 without being connected to the radiator 1110. However, the present disclosure is not limited to this structure, and the feed structure 1120 and the radiator 1110 may be connected by a vertical via structure.

When the radiator 1110 and the feed structure 1120 are disposed in different layers, the coupled signal is transmitted from the feed structure 1120 to the radiator 1110 to operate as an antenna. Accordingly, a conductor disposed at an upper portion of the feed structure 1120 may also functionally operate as a radiator. In this regard, the radiator disposed in a first layer may be referred to as a first radiator 1110*a*. Furthermore, conductors disposed at an upper portion of the feed structure 1120 to apply polarization signals orthogonal to each other to the radiator 1110 may be referred to as a second radiator 1120*a* and a third radiator 1120*b*, respectively.

Meanwhile, the first radiator 1110*a*, the second radiator 1120*a*, and the third radiator 1120*b* constitute respective conductors in an entire radiator, and thus may be referred to as a first conductor 1110, a second conductor 1120*a*, and a third conductor 1120*b*, respectively. Meanwhile, the second radiator 1120*a* and the third radiator 1120*b* transmit wireless signals to the first radiator 1110*a* corresponding to the patch antenna. Accordingly, the second radiator 1120*a* and the third radiator 1120*b* may be referred to a first feeder 1120*a* and a second feeder 1120*b*, respectively.

The lower ground layer 1150 may be disposed in a lower region of a conductive layer constituting the radiator 1110. The lower ground layer 1150 is configured to operate as a ground for the radiator.

Meanwhile, the multi-layer ground structure 1160 according to the present disclosure may be disposed in one region of the multi-layer substrate. The multi-layer ground structure 1160 may be disposed at an angle with respect to a horizontal plane of the multi-layer substrate and may be referred to as a rolled ground. The multi-layer ground structure 1160 may be connected to the lower ground layer 1150.

Various configurations of the multi-layer ground structure 1160 of a rolled ground structure presented in the present disclosure will be described in detail. In this regard, FIGS. 9A to 10B show cross-sectional views of multi-layer ground structures according to various embodiments of the present disclosure.

FIGS. 9A to 10B show a structure in which the multi-layer ground structure 1160 is disposed in one region of the multi-layer substrate, and a ground wall 1165 in the form of a via wall is disposed on the other region of the multi-layer substrate. In this regard, in the multi-layer ground structure 1160 of the rolled ground structure, a conductive layer in the form of a conductive pad is disposed in each layer of the multi-layer substrate, and respective conductive layers in the form of the conductive pad are connected to one another in a vertical via structure.

Figure 9A:
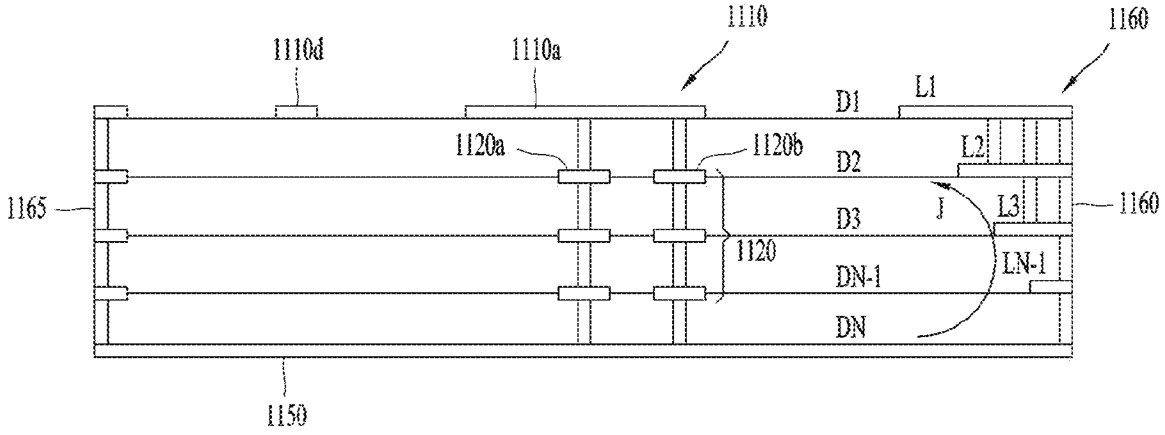
FIGS. 9A to 10B show cross-sectional views of multi-layer ground structures according to various embodiments of the present disclosure.
Figure 9B:
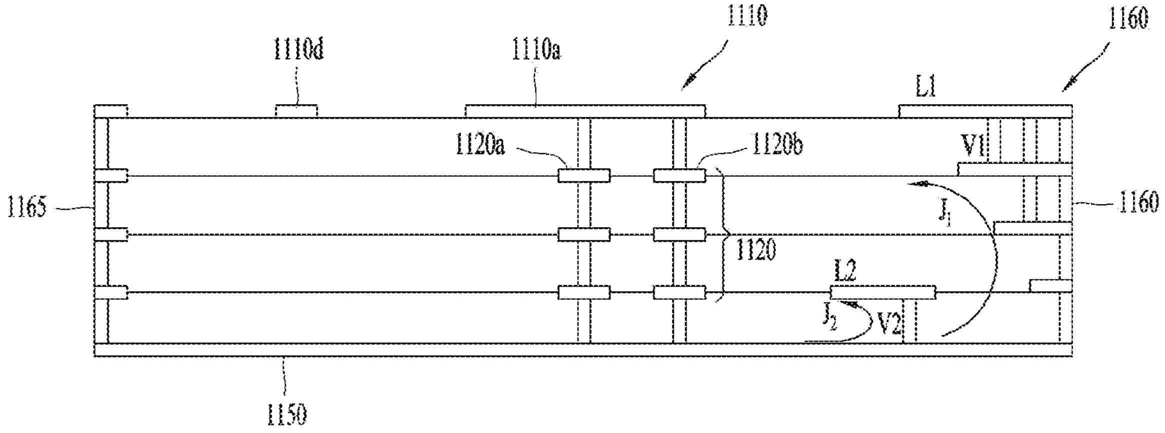
Figure 10A:
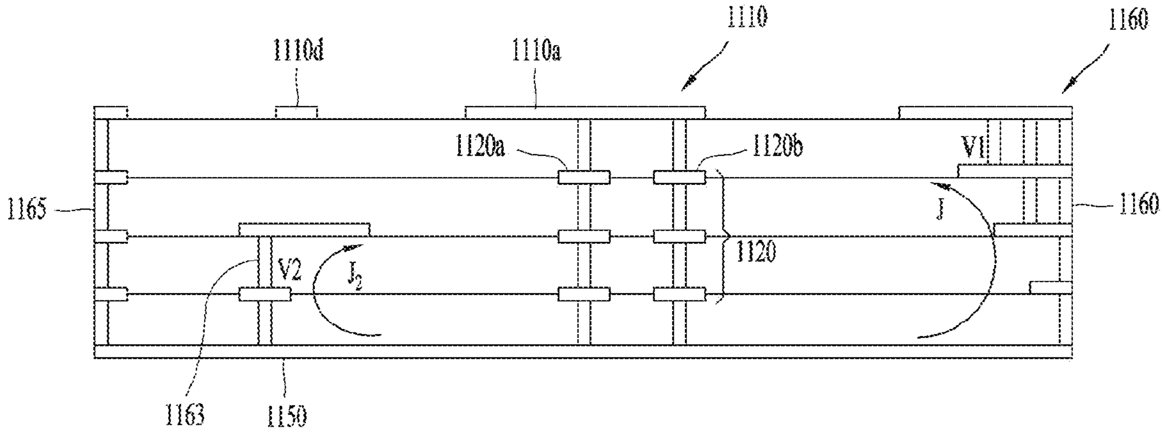

FIGS. 9B and 10A show examples in which the multi-layer ground structure 1160 of the rolled ground structure is configured with a two-stage structure. In this regard, since the lengths of a first current ($J_1$) path and a second current ($J_2$) path are different from each other, respective multi-layer ground structures may operate at different frequencies. Meanwhile, as shown in FIG. 10B, the position of the multi-layer ground structure that forms a second current $J_2$ may be disposed at a different position on the multi-layer substrate from that of the multi-layer ground structure that forms a first current $J_1$.

Figure 10B:
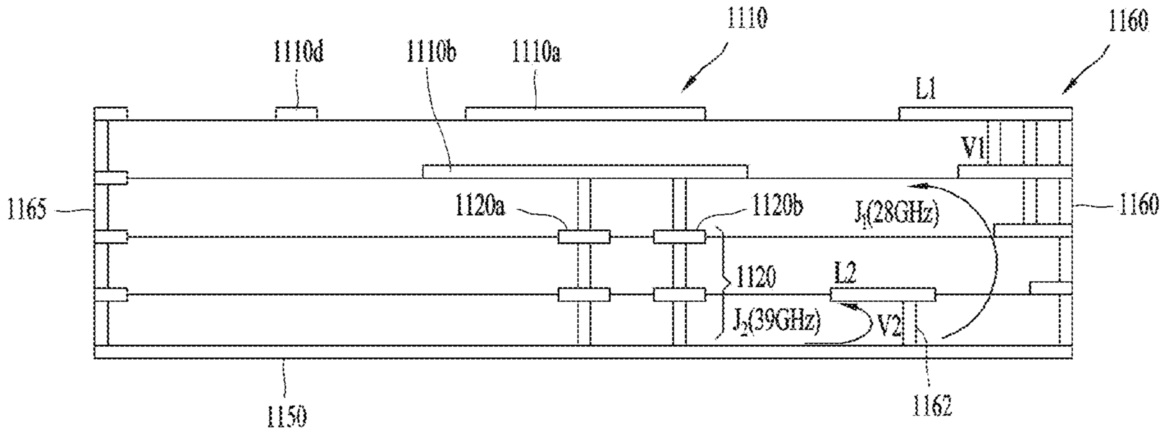

For a representative embodiment operating at different frequencies, dual bands of 28 GHz and 39 GHz in 5G millimeter wave bands may be taken into account as shown in FIG. 10B, but the present disclosure is not limited thereto. As shown in FIG. 10B, when operating two frequencies with one patch antenna, the first current $J_1$ and the second current $J_2$ are required to obtain a beam-tilt effect at both frequencies. Since the wavelength is 10.7 mm for 28 GHz and 7.7 mm for 39 GHz, a structure for forming the first current ($J_1$) and second current ($J_2$) paths having different lengths is designed. The first current $J_1$ with a relatively long path length operates at a low frequency of 28 GHz, and the second current $J_2$ with a relatively short path length operates at a high frequency of 39 GHz.

Referring to FIGS. 8A to 9B, the multi-layer ground structure 1160 may be configured to have a different end position for each layer so as to be spaced apart by a different distance from the radiator 1110 for each layer of the multi-layer substrate. In this regard, an end position of the multi-layer ground structure 1160 in a lower region of the multi-layer substrate may be disposed closer to a side surface region. In other words, each ground layer disposed in the multi-layer ground structure 1160 may be disposed to further decrease a length thereof in one axial direction in the lower region.

In this regard, the multi-layer ground structure 1160 may be configured with a plurality of ground layers. The end positions of the plurality of ground layers in the multi-layer ground structure 1160 are disposed in a side surface region as being disposed in the lower region. Accordingly, each ground layer disposed on each layer may be configured to further decrease a length thereof in one axial direction in the lower region. Specifically, the multi-layer ground structure 1160 may be disposed to gradually decrease a length thereof, L1 in a first layer, L2 in a second layer, L3 in a third layer, and LN−1 in an (N−1)th layer. Meanwhile, a distance from one end of the radiator 1110 to one end of the multi-layer ground structure 1160 may be disposed to gradually increase the distance, D1 in the first layer, D2 in the second layer, D3 in the third layer, and DN in the N-th layer.

The multi-layer ground structure 1160 may include vertical vias that vertically connect between ground layers adjacent thereto. Each ground layer of the multi-layer ground structure 1160 disposed on each layer of the multi-layer substrate is configured to further decrease a length thereof in one axial direction in the lower region. Accordingly, the plurality of ground layers of the multi-layer ground structure 1160 may be configured such that a number of vertical vias decreases as being disposed in the lower region. Accordingly, the multi-layer ground structure 1160 may be configured with a rolled ground structure.

The multi-layer ground structure 1160 may be disposed in one region of the radiator 1110. Meanwhile, the antenna module 1100 may further include a dummy patch 1110*d* disposed to be spaced apart by a predetermined distance from the radiator in the other region of the radiator.

The radiator 1110 and the dummy patch 1110*d* may be disposed in the same layer. The dummy patch 1110*d* may be disposed along an outline of the radiator 1110 to correspond to a shape of the radiator 1110. The dummy patch 1110*d* may be disposed to be spaced apart by a predetermined distance from the outline of the radiator 1110.

The radiator 1110 may be configured with a circular patch disposed in the first layer. The dummy patch 1110*d* may be disposed to have an arc shape with a predetermined angle range in the first layer. The radiator 1110 may include a first radiator 1110*a* and a second radiator 1120*a* corresponding to circular patches, respectively. The first radiator 1110*a* may be disposed in the first layer and configured to radiate a wireless signal in a predetermined direction. The second radiator 1120*a* may be disposed in a lower region of the first radiator to be offset from the center of the first radiator 1110*a*. In this regard, the second radiator 1120*a* may be disposed in a second layer, which is a lower layer of the first layer. However, the present disclosure is not limited thereto, and the second radiator 1120*a* may be disposed in any lower layer below the first layer. The second radiator 1120*a* may be configured with a second conductive layer that transmits a wireless signal to the first radiator 1110*a*.

The radiator 1110 is disposed in an asymmetric ground region between the multi-layer ground structure 1160 disposed in an inclined shape in one region and a ground wall 1165 disposed in a vertical shape in the other region. Accordingly, as shown in FIG. 7B, the direction of a main beam of the radiator 1110 may be tilted by a predetermined angle from a vertical direction of the multi-layer substrate.

The antenna element disclosed in the present disclosure may be configured as a single polarized antenna or a dual polarized antenna. The second radiator 1120*a* and the third radiator 1120*b* constituting the feed structure 1120 may also transmit wireless signals to the first radiator 1110*a* while radiating some of the wireless signals on their own. Therefore, the first radiator 1110*a* and the second radiator 1120*a* may be disposed with a first patch antenna and a second patch antenna, respectively, and may be configured as a single polarized antenna. The second patch antenna may be connected to a feed line inside the multi-layer substrate through a signal via V1 at a first point P1 that is offset in one axial direction.

The antenna module 1100 may include a third patch, which is a third radiator 1120*b* connected to a second feed line through a second signal via V2 at a second point P2 that is offset in the other axial direction orthogonal to the one axial direction. Accordingly, the radiator 1100 in the antenna module 1100 may operate as a dual polarized antenna.

In the dual polarized antenna, the first radiator 1110*a*, the second radiator 1120*a*, and the third radiator 1120*b* may be disposed as a first patch antenna, a second patch antenna, and a third patch antenna, respectively. The second patch antenna and the third patch antenna are disposed in the one axial direction and the other axial direction in the same layer of the multi-layer substrate. Accordingly, a first signal and a second signal formed in the second patch antenna and the third patch antenna may be transmitted to the first patch antenna thereabove. Accordingly, the first patch antenna, which is the first radiator 1110*a* fed by the second radiator 1120*a* and the third radiator 1120*b*, may operate as a dual polarized antenna with horizontal polarization and vertical polarization.

The multi-layer ground structure 1160 may be configured with a multi-layer ground structure having different structures. Accordingly, the beam peak direction may be tilted by a predetermined angle while the radiator operates in a broad band in different frequency bands. In this regard, FIG. 9B shows a structure in which the multi-layer ground structure 1160 is configured with a first ground structure 1161 and a second ground structure 1162 therebelow. Meanwhile, FIG. 10A shows a structure in which the multi-layer ground structure 1160 is configured with the first ground structure 1161 and a third ground structure 1163 in the other region.

Referring to FIG. 9B, the multi-layer ground structure 1160 may include the first ground structure 1161 and the ground structure 1162. The first ground structure 1161 may be configured such that a vertical via V1 connecting conductive layers adjacent thereto is disposed in one side region of the multi-layer substrate. The second ground structure 1162 may be connected to the lower ground layer 1150 by a second vertical via V2 at a second position spaced apart by a predetermined distance from one side end of the multi-layer substrate. The multi-layer ground structure 1160 may be configured to further include a ground wall 1165 connected to the other region of the multi-layer substrate through a vertical via.

Referring to FIG. 10A, the multi-layer ground structure 1160 may include a first ground structure 1161, a ground wall 1165, and a third ground structure 1163. The first ground structure 1161 may be configured such that a vertical via V1 connecting conductive layers adjacent thereto is disposed in one side region of the multi-layer substrate. The ground wall 1165 may be connected to the lower ground layer 1150 to constitute the other side region of the multi-layer substrate. The third ground structure 1163 may be disposed in a lower region of the dummy patch 1110*d* in a region between the ground wall 1165 and the radiator 1110. The third ground structure 1163 may be connected to the lower ground layer 1150 by a third vertical via V3 at a third position spaced apart by a predetermined distance from the other side end of the multi-layer substrate.

Meanwhile, in the antenna module presented in the present disclosure, a conductor corresponding to the feed structure 1120 may be physically connected to or spaced apart from the first radiator 1110*a*, which operates as a main antenna, by a via. Referring to FIGS. 8A and 8B, the second radiator 1120$a$ and the third radiator 1120$b$ constituting the feed structure 1120 may be disposed in a layer that is different from that of the first radiator 1110$a$ and configured not to be connected thereto. Accordingly, the first signal from the second radiator 1120$a$ and the second signal from the third radiator 1120$b$ may be coupled to the first radiator 1110$a$.

Referring to FIGS. 9A to 10B, the second radiator 1120$a$ and the third radiator 1120$b$ may be connected to the first radiator 1110$a$ through a vertical via. The first signal from the second radiator 1120$a$ and the second signal from the third radiator 1120$b$ may be directly transmitted to the first radiator 1110$a$.

Referring to FIG. 10B, the antenna element presented in the present disclosure may be configured with a dual patch antenna structure disposed in different layers. In this regard, the radiator 1110 may include an upper radiator 1110$a$ and a lower radiator 1110$b$. The upper radiator 1110$a$ may be disposed in a first layer, and configured with a conductor operating in a first frequency band. The lower radiator 1110$b$ may be disposed in a second layer, which is a lower region of the upper radiator 1110$a$. The lower radiator 1110$b$ may be disposed to be larger than the upper radiator 1110$a$ so as to operate in a second frequency band lower than the first frequency band.

In this regard, the upper radiator 1110$a$ and the lower radiator 1110$b$ may be configured to operate in a 39 GHz band and a 28 GHz band, respectively, but are not limited thereto. As another example, the upper radiator 1110$a$ and the lower radiator 1110$b$ may be configured to operate in a first frequency band within the 60 GHz band and a second frequency band lower than the first frequency band.

The lower radiator 1100$b$ may be connected to a feed line through a signal via V1 at a first point that is offset in one axial direction. The lower radiator 1100$b$ may be connected to a second feed line through a second signal via V2 at a second point that is offset in the other axial direction orthogonal to the one axial direction. Therefore, the lower radiator 1100$b$ may be physically connected to the feed structure 1120, and the upper radiator 1100$a$ may be disposed above the lower radiator 1100$b$. As another example, the lower radiator 1100$b$ may not be connected to the feed structure 1120 but may be configured with a coupling structure as shown in FIGS. 8A and 8B.

A stacked patch structure of the upper radiator 1110$a$ and the lower radiator 1100$b$ may also be combined with the multi-layer ground structure 1160. For a broadband operation of the antenna element, the multi-layer ground structure 1160 may also include a first ground structure 1161 and a second ground structure 1162 to operate in different frequency bands.

In this regard, the first ground structure 1161 may be configured such that a vertical via V1 connecting conductive layers adjacent thereto is disposed in one side region of the multi-layer substrate. The first ground structure 1161 may be disposed to have a first length $L_1$ in the first layer. The second ground structure 1162 may be connected to the lower ground layer 1150 by a second vertical via V2 at a second position spaced apart by a predetermined distance from one side end of the multi-layer substrate. The second ground structure 1162 may be disposed in the second layer to have a second length $L_2$ shorter than the first length $L_1$. The multi-layer ground structure 1160 may be configured to further include a ground wall 1165 connected to the other region of the multi-layer substrate through a vertical via.

The first ground structure 1161 may be configured to operate in a second frequency band with the lower radiator 1110$b$. Meanwhile, the second ground structure 1162 may be configured to operate in a first frequency band with the upper radiator 1110$a$. In this regard, the first ground structure 1161 may form a first current distribution $J_1$ in the 28 GHz band. Meanwhile, the second ground structure 1162 may form a second current distribution $J_2$ by a second signal in the 39 GHz band.

Meanwhile, the antenna structure disclosed in the present disclosure may further include a dummy patch 1110$d$ disposed on at least one side of the radiator to optimize a broadband operation and a radiation pattern thereof. In this regard, FIGS. 11A to 11C show structures in which dummy patch structures according to different embodiments are disposed on a multi-layer substrate.

Figure 11A:
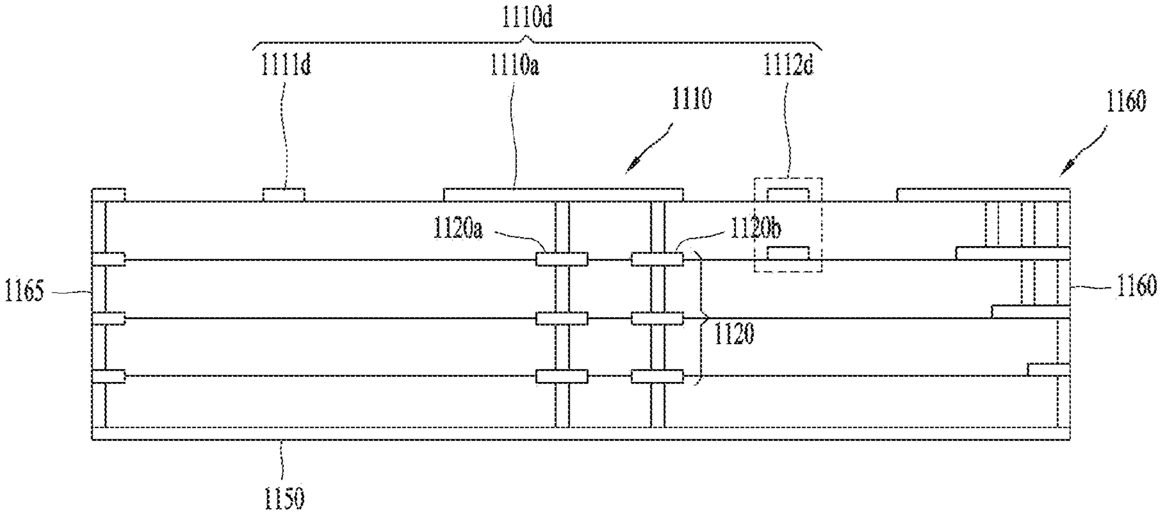
FIGS. 11A to 11C show structures in which dummy patch structures according to different embodiments are disposed on a multi-layer substrate.
Figure 11B:
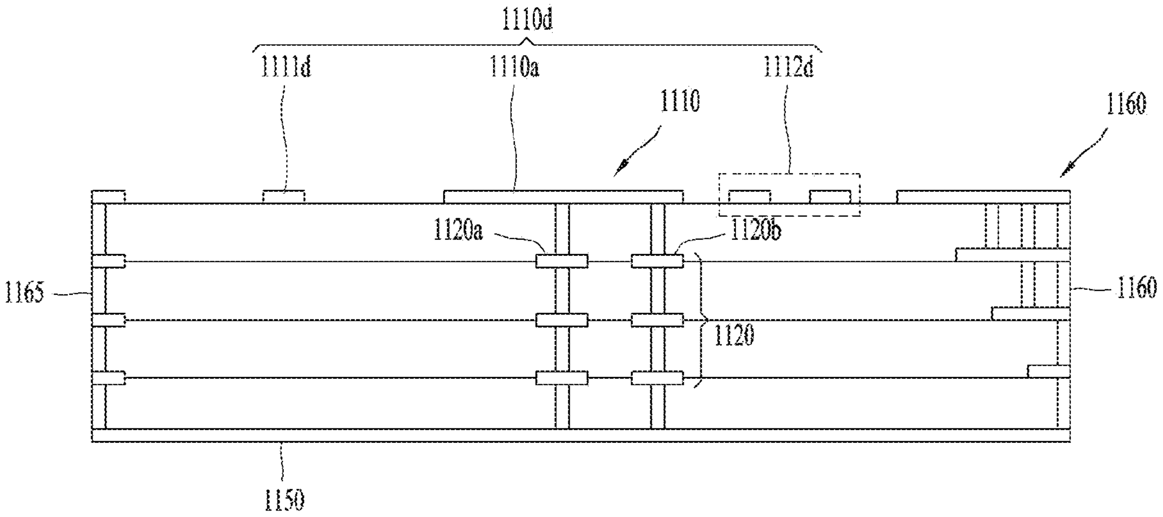
Figure 11C:
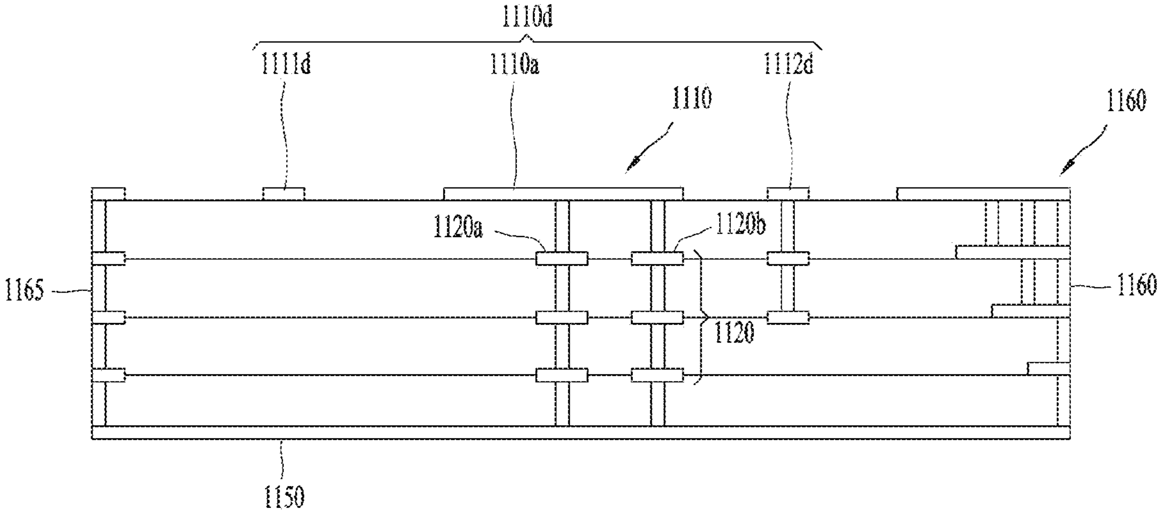

Referring to FIGS. 11A to 11C, the dummy patch 1110$d$ may function as a director that guides radio waves in a specific direction, but may also function as a reflector that reflects radio waves in a specific direction.

A structure of the dummy patch 1110$d$ in FIG. 11A uses two dummy patches, and respective dummy patch are disposed above and below the multi-layer substrate. Meanwhile, a structure of the dummy patch 1110$d$ in FIG. 11B also uses two dummy patches. Respective dummy patches are disposed on left and right sides between the radiator 1110 and the multi-layer ground structure 1160 on the multi-layer substrate. In case where two or more dummy patches 1110$d$ are disposed, currents in opposite directions are formed due to the influence of mirror currents to cause an effect of pushing radio waves.

A structure of the dummy patch 1110$d$ in FIG. 11C shows a case in which two or more dummy patches 1110$d$ stacked vertically are connected with a vertical via or vertical vias. In this case, a current in a direction different from that of the patch antenna 1110$a$ is generated so as to function as a reflector to push radio waves. Therefore, in case where the first dummy patch 1111$d$ and the second dummy patch 1112$d$ as shown in FIGS. 11A to 11C are used together, the direction of electromagnetic waves may be further guided to increase beam coverage.

The dummy patch 1110$d$ may include a first dummy patch 1111$d$ and a second dummy patch 1112$d$. The first dummy patch 1111$d$ may be disposed between the ground wall 1165 and the radiator 1110 disposed in the other region of the multi-layer substrate. The first dummy patch 1112$d$ may be disposed between the radiator 1110 and the multi-layer ground structure 1160 disposed in one region of the multi-layer substrate.

The second dummy patch 1112$d$ may include one or more dummy patterns. As an example, the second dummy patch 1112$d$ may include a first dummy pattern DP1 and a second dummy pattern DP2, but is not limited thereto and may include more dummy patterns. Referring to FIG. 11A, the first dummy pattern DP1 and the second dummy pattern DP2 may be disposed to be spaced apart from each other in a first layer and a second layer, which is a lower layer of the first layer.

Referring to FIG. 11B, the first dummy pattern DP1 and the second dummy pattern DP2 may be disposed to be spaced apart from each other on the first layer, but are not limited thereto. In this regard, the first dummy pattern DP1 and the second dummy pattern DP2 may be disposed to be spaced apart from each other in the same layer.

As an example, referring to FIG. 11C, the first dummy pattern DP1 and the second dummy pattern DP2 may be disposed to be connected to each other by one or more vertical vias.

Meanwhile, an operation mechanism of the multi-layer ground structure 1160 will be described in consideration of a current distribution according to the multi-layer ground structure 1160, which is a rolled ground structure presented in the present disclosure. In this regard, FIG. 12A shows a radiation direction of electromagnetic waves according to different ground structures.

Figure 12A:
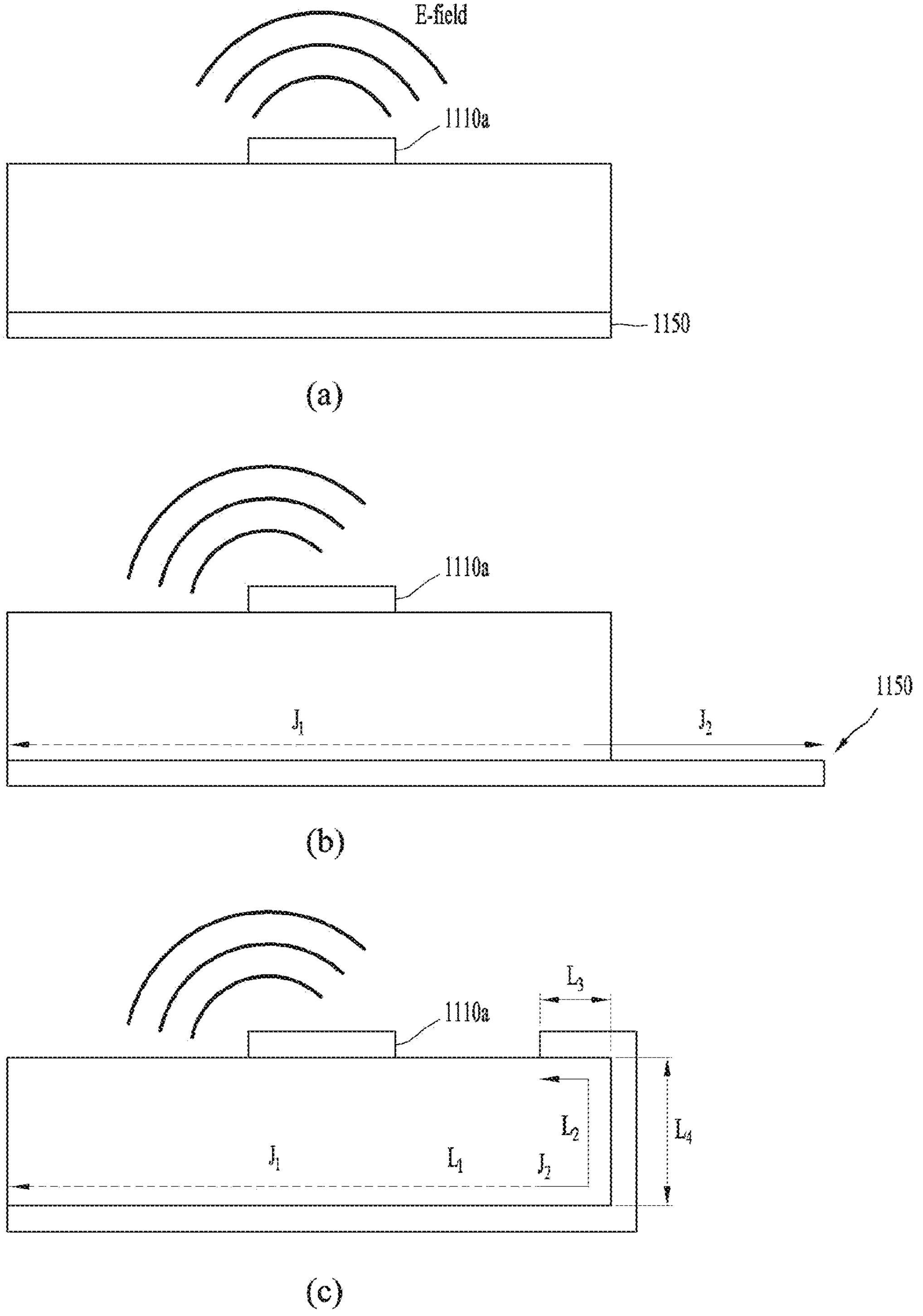
FIG. 12A shows a radiation direction of electromagnetic waves according to different ground structures.

(a) of FIG. 12A shows an antenna structure in which the patch antenna 1110$a$ is disposed above a dielectric substrate and the ground layer 1150 is disposed therebelow. Referring to (a) of FIG. 12A, a first current $J_1$ is generated in one direction in the ground layer 1150, and an electric field is generated in a front direction of the patch antenna 1110$a$ to radiate electromagnetic waves.

(b) of FIG. 12A shows an antenna structure in which the patch antenna 1110$a$ is disposed above a dielectric substrate and the ground layer 1150 is expanded therebelow. In this regard, the ground layer 1150 may include a first ground layer 1151 disposed below the dielectric substrate and a second ground layer 1152 extending from the first ground layer 1151. Therefore, when the ground layer 1150 for the patch antenna 1110$a$ is increased in one direction, a second current $J_2$ is generated in a direction opposite to the first current $J_1$. Due to the second current $J_2$ formed in a direction opposite thereto, a main radiation direction of the patch antenna 1110$a$ is tilted by a predetermined angle in a direction opposite to the second current $J_2$ with respect to a vertical axis.

Referring to (c) of FIG. 12A, the multi-layer ground structure 1160 configured with a rolled ground structure is shown. When the expanded ground layer 1150 is rolled up along the dielectric substrate, the second current $J_2$ is also formed to be rolled up. With this multi-layer ground structure 1160, an overall design space of the antenna module 1100 may be reduced in size, and at the same time, an adjusted main radiation direction may be maintained.

For the effect of the rolled ground structure formed by the first current $J_1$ and the second current $J_2$, each dimension of the multi-layer ground structure 1160 may be configured to satisfy the following conditions. A length $L_1$ of the first ground layer 1151 of the multi-layer ground structure 1160 may correspond to a length of the first current $J_1$, and an electrical length thereof may be disposed to have $\lambda_0/4<L_1<3\lambda_0/4$. A length $L_2$ of the second ground layer 1160$a$ of the multi-layer ground structure 1160$a$ may correspond to a length of the second current $J_2$, and an electrical length thereof may be disposed to have 0 mm$<L_2<3\lambda_0 4$.

A length $L_3$ of the third ground layer 1160$b$ of the multi-layer ground structure 1160 may correspond to a length of the second current $J_2$ formed above the dielectric. Meanwhile, a length $L_4$ on a dielectric side surface of the multi-layer ground structure 1160 corresponds to a current length in a vertical direction. The length $L_3$ of the third ground layer 1160$b$ and the length $L_4$ on the dielectric side surface may be disposed to satisfy $L_3>L_4$, thereby reducing a size of the antenna module according to the rolled ground structure and adjusting a radiation pattern direction according to its cavity structure. For example, since $\lambda_0$=5 mm in the 60 GHz band, the conditions of 1.25 mm$<L_1<$3.75 mm, 0 mm$<L_2<$3.75 mm, and $L_3>L_4$ may be satisfied.

Figure 12B:
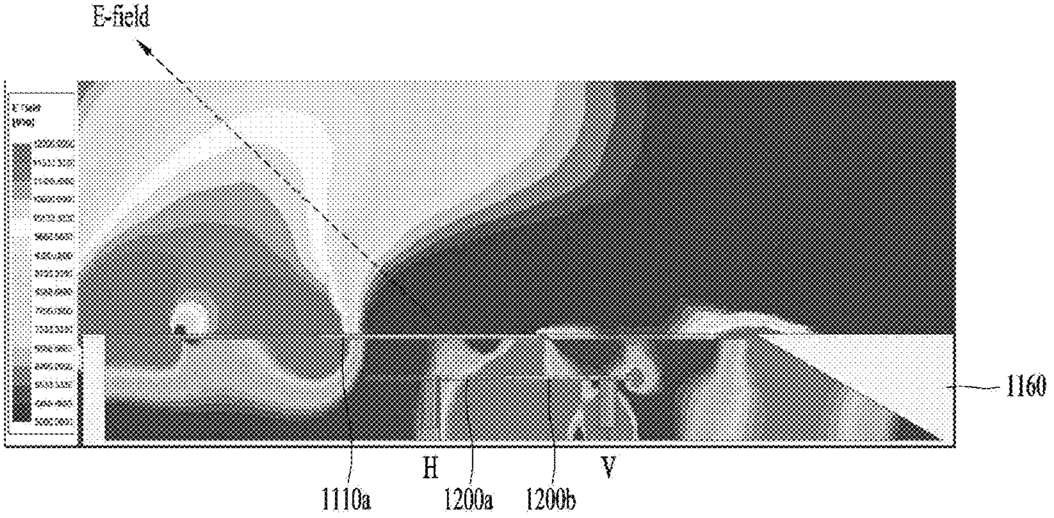
FIG. 12B shows an electric field distribution and a resultant radiation direction in a structure of a patch antenna disposed with a rolled ground structure according to the present disclosure.

Meanwhile, an operation mechanism of radial direction change according to the rolled ground structure of the present disclosure will be described as follows. In this regard, FIG. 12B shows an electric field distribution and a resultant radiation direction in a structure of a patch antenna disposed with a rolled ground structure according to the present disclosure. Specifically, FIG. 12B shows a current distribution and a resultant radiation direction of an electric field (E-field) in a cross-sectional view of the patch antenna 1110$a$ seen from the side.

Referring to FIG. 8B, (c) of FIG. 12A, and the current distribution of FIG. 12B, an electric field distribution having a higher value than other regions is formed by the second current $J_2$ in a region disposed with the rolled ground structure. Therefore, it can be seen that the main radiation direction is inclined at a predetermined angle in an opposite direction from a vertical direction of the patch antenna 1110$a$ according to the electric field distribution having a high value in a region adjacent to the rolled ground structure 1160.

Figure 13A:
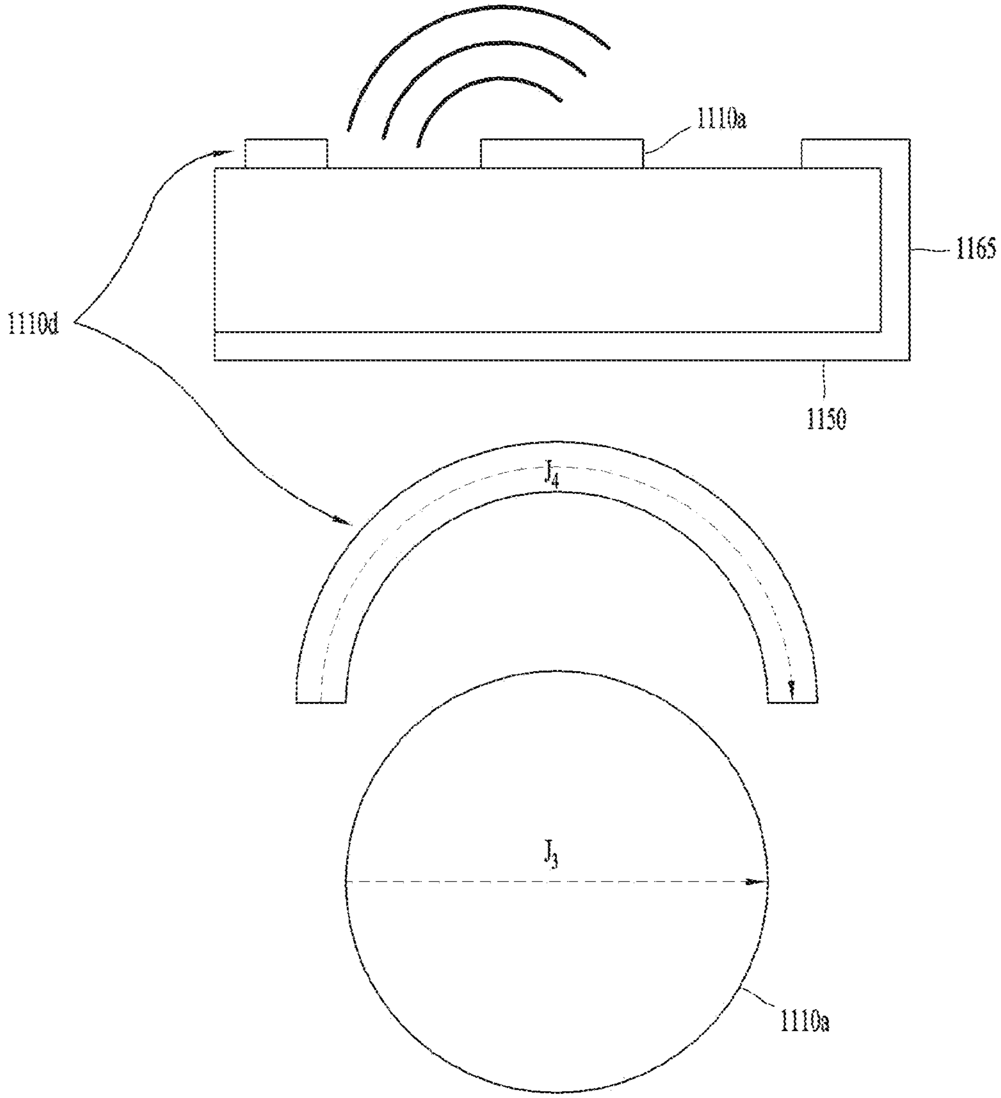
FIG. 13A shows a side view and a front view of an antenna module in which a rolled ground structure and a dummy patch according to the present disclosure are disposed.

Meanwhile, a dummy patch may be disposed adjacent to the patch antenna in the rolled ground structure presented in the present disclosure. In this regard, FIG. 13A shows a side view and a front view of an antenna module in which a rolled ground structure and a dummy patch according to the present disclosure are disposed. (a) of FIG. 13A shows a side view of the antenna module, and (b) of FIG. 13A shows the patch antenna 1110$a$ and the dummy patch 1110$d$ according to the front view of the antenna module and a current distribution formed thereon.

The dummy patch 1110$d$ may be disposed on a side opposite to the rolled ground structure 1160 with the patch antenna 1110$a$ as the center to function as a director that adjusts a main radiation direction of the antenna module. A third current $J_3$ may be formed in a left-right direction by feeding horizontally polarized waves (H-pol.) to the patch antenna 1110$a$.

The third current $J_3$ formed in the patch antenna 1110$a$ passes through a ground having the rolled ground structure 1160 and is coupled to the dummy patch 1110$d$ adjacent thereto to form a fourth current $J_4$ in the same direction at a different time. Accordingly, in a chronological order, the third current $J_3$ is generated first, and then the fourth current $J_4$ is induced, and the phases of electric fields generated by this time difference are formed differently. The main radiation direction is tilted toward the dummy patch 1110$d$ due to a phase difference between the third current $J_3$ formed in the patch antenna 1110$a$ and the fourth current $J_4$ induced in the dummy patch 1110$d$.

Figure 13B:
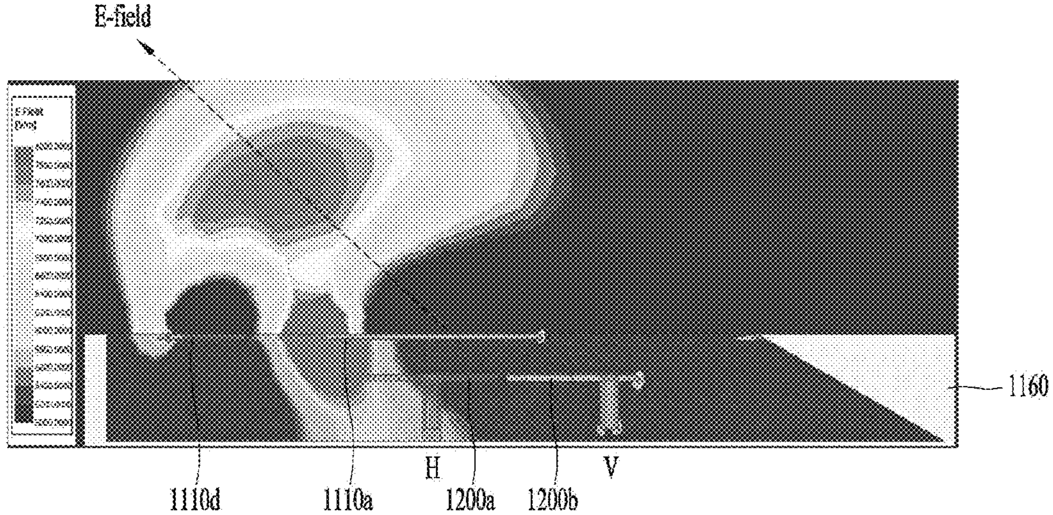
FIG. 13B shows an electric field distribution and a resultant radiation direction in a structure of a patch antenna disposed with a dummy patch according to the present disclosure.

Meanwhile, an operation mechanism of radial direction change according to the dummy patch of the present disclosure will be described as follows. In this regard, FIG. 13B shows an electric field distribution and a resultant radiation direction in a structure of a patch antenna disposed with a dummy patch according to the present disclosure. Specifically, FIG. 13B shows a current distribution and a resultant radiation direction of an electric field (E-field) in a cross-sectional view of the patch antenna 1110$a$ and the dummy patch 1110$d$ seen from the side. Comparing a current distribution diagram in FIG. 13B with a current distribution diagram in FIG. 12B, FIG. 13B shows a current distribution diagram in a structure in which only a dummy patch structure is disposed without a rolled ground structure.

Referring to FIG. 8B and a current distribution in FIG. 13B, it can be seen that due to the effect of an electric field formed by coupling in the patch antenna 1110$a$ being tilted in a direction of the dummy patch 1110*d*, a direction of the electric field direction is tilted toward an upper region with respect to a vertical axis.

Figure 14:
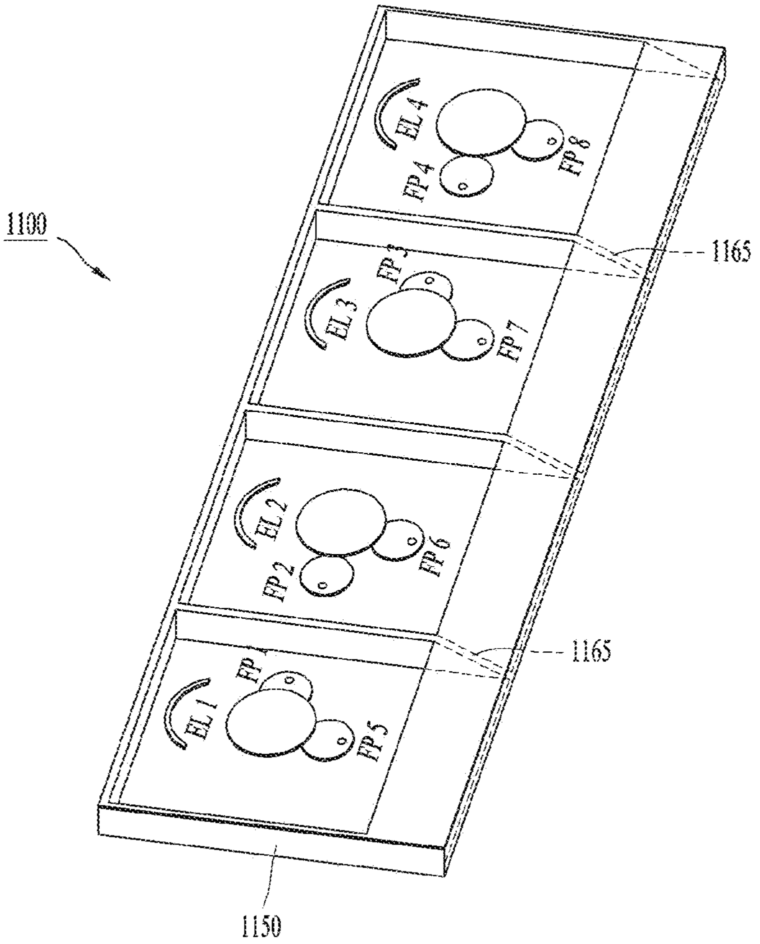
FIG. 14 shows an antenna module in which one end of a ground wall between array antennas is configured with a multi-layer ground structure.

Meanwhile, an antenna module with the multi-layer ground structure presented in the present disclosure may be configured with an array antenna structure in which a plurality of antenna elements are disposed. In this regard, FIG. 14 shows an antenna module in which one end of a ground wall between array antennas is configured with a multi-layer ground structure. Referring to FIG. 14, a structure in which a single antenna element including the radiator 1110 and the dummy patch 1110*d* according to the present disclosure is disposed as a 1×4 array antenna.

Figure 15A:
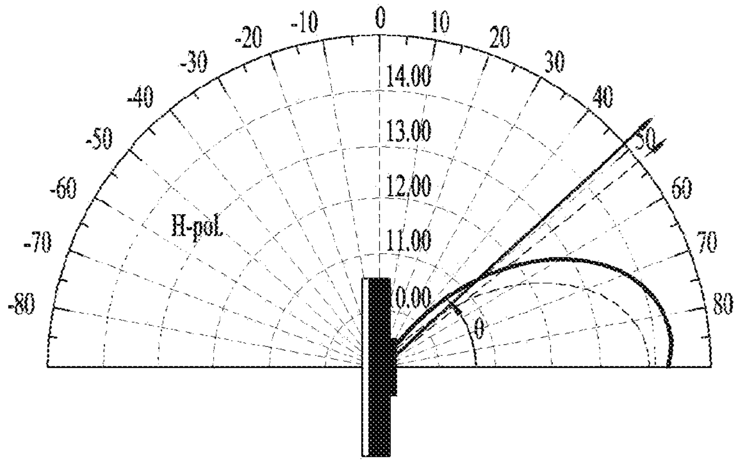
FIGS. 15A and 15B show radiation patterns when a horizontally polarized signal and a vertically polarized signal of a single antenna element of FIG. 14 are applied.
Figure 15B:
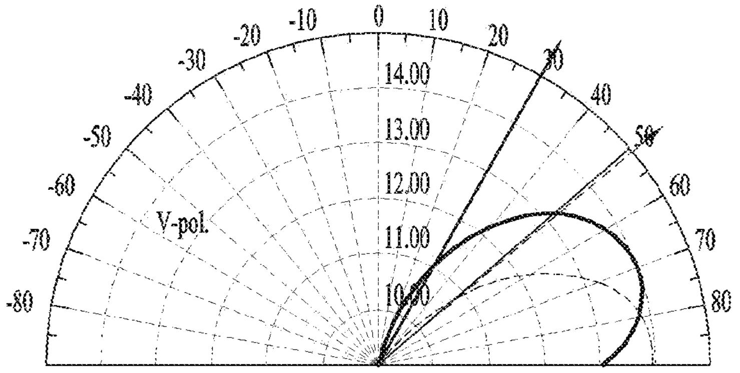

In this regard, FIGS. 15A and 15B show radiation patterns when a horizontally polarized signal and a vertically polarized signal of a single antenna element of FIG. 14 are applied. Referring to FIGS. 15A and 15B, the peak direction and beam coverage of a beam pattern in a vertical direction are shown when a horizontally polarized signal and a vertically polarized signal of a single antenna element are applied.

With regard to FIGS. 8A to 11C, and 14, the rolled ground structure 1160 may be disposed in the same manner in a lower region for all of 1×2, 1×4, and 1×N array antennas, or only in a lower partial region thereof. Meanwhile, the dummy patch 1110*d* may be disposed in an upper region for all of the patch antennas 1110*a*.

The position of a first feed pad 1120*a* for a horizontal polarization (H-pol.) may be disposed in a left or right region of the patch antenna 1110*a*. The position of a second feed pad 1120*b* for a vertical polarization (V-pol.) may be disposed in an upper or lower region of the patch antenna 1110*a*, but in this embodiment, it is all disposed in the lower region.

Referring to FIGS. 8A to 11C, 14, and 15A, beam coverage for a horizontal polarization (H-pol.) may be about 42 degrees. In this regard, in the absence of the dummy patch 1110*d* and the rolled ground structure 1160, beam coverage for a horizontal polarization (H-pol.) may be about 37 degrees. Accordingly, the beam coverage of the dummy patch 1110*d* and the rolled ground structure 1160 according to the present disclosure may be expanded by about 5 degrees. Meanwhile, the beam peak angle for a horizontal polarization (H-pol.) may also be tilted by about 10 degrees compared to the control group.

Referring to FIGS. 14 and 15B, beam coverage for a vertical polarization (V-pol.) may be about 60 degrees. In this regard, in the absence of the dummy patch 1110*d* and the rolled ground structure 1160, beam coverage for a vertical polarization (V-pol.) may be about 40 degrees. Accordingly, the beam coverage of the dummy patch 1110*d* and the rolled ground structure 1160 according to the present disclosure may be expanded by about 20 degrees. Meanwhile, the beam peak angle for a vertical polarization (V-pol.) may also be tilted by about 20 degrees compared to the control group.

Referring to FIGS. 8A, 8B, and 14, an antenna module 1100 in which one end of a ground wall between array antennas is configured with a multi-layer ground structure will be described. The antenna module 1100 may constitute an array antenna in which a plurality of radiators 1110 are arranged at a predetermined distance in at least one axial direction. The array antenna may include a first antenna element EL1 and a second antenna element EL2 adjacent to the first antenna element EL1. Additionally, the array antenna may further include a third antenna element EL3 adjacent to the second antenna element EL2 and a fourth antenna element EL4 adjacent to the third antenna element EL3.

The ground wall 1165 may be disposed in a side surface region of the multi-layer substrate. Meanwhile, the multi-layer ground structure 1160 may be disposed between the first antenna element EL1 and the second antenna element EL2. The multi-layer ground structure 1160 may be disposed in one region of the multi-layer substrate, for example, a lower region thereof. Meanwhile, the multi-layer ground structure 1160 may be disposed between the third antenna element EL3 and the fourth antenna element EL4. The ground wall 1165 may be disposed between the second antenna element EL2 and the third antenna element EL3, but is not limited thereto. As another example, the multi-layer ground structure may also be disposed between the second antenna element EL2 and the third antenna element EL3.

The first antenna element EL1 and the second antenna element EL2 may be disposed in a symmetrical shape around the multi-layer ground structure 1160. Additionally, the third antenna element EL3 and the fourth antenna element EL4 may be disposed in a symmetrical shape around the multi-layer ground structure 1160. In this regard, first to fourth feed patches FP1 to FP4 may constitute the feed structure 1120. The first to fourth feed patches FP1 to FP4 are configured to apply a first signal having a first polarization to the first to fourth antenna elements EL1 to EL4. Meanwhile, fifth to eighth feed patches FP5 to FP8 are configured to apply a second signal having a second polarization to the first to fourth antenna elements EL1 to EL4.

The first feed patch FP1 may be disposed in one region of the first antenna element EL1 in one axial direction, and the second feed patch FP2 may be disposed in the other region of the second antenna element EL2. Accordingly, the first antenna element EL1 and the second antenna element EL2 may be disposed in a symmetrical shape around the multi-layer ground structure 1160. In addition, the third feed patch FP3 may be disposed in one region of the third antenna element EL3 in one axial direction, and the fourth feed patch FP4 may be disposed in the other region of the fourth antenna element EL4. Accordingly, the third antenna element EL3 and the fourth antenna element EL4 may be disposed in a symmetrical shape around the multi-layer ground structure 1160.

The multi-layer ground structure 1160 may be disposed at one end of the multi-layer substrate, that is, at an end of a lower region thereof. Additionally, the multi-layer ground structure 1160 may be disposed between feed patches adjacent thereto having a first polarization. In this regard, the multi-layer ground structure 1160 may be disposed between the first feed patch FP1 and the second feed patch FP2. The multi-layer ground structure 1160 may be disposed between the third feed patch FP3 and the fourth feed patch FP4.

Figure 16:
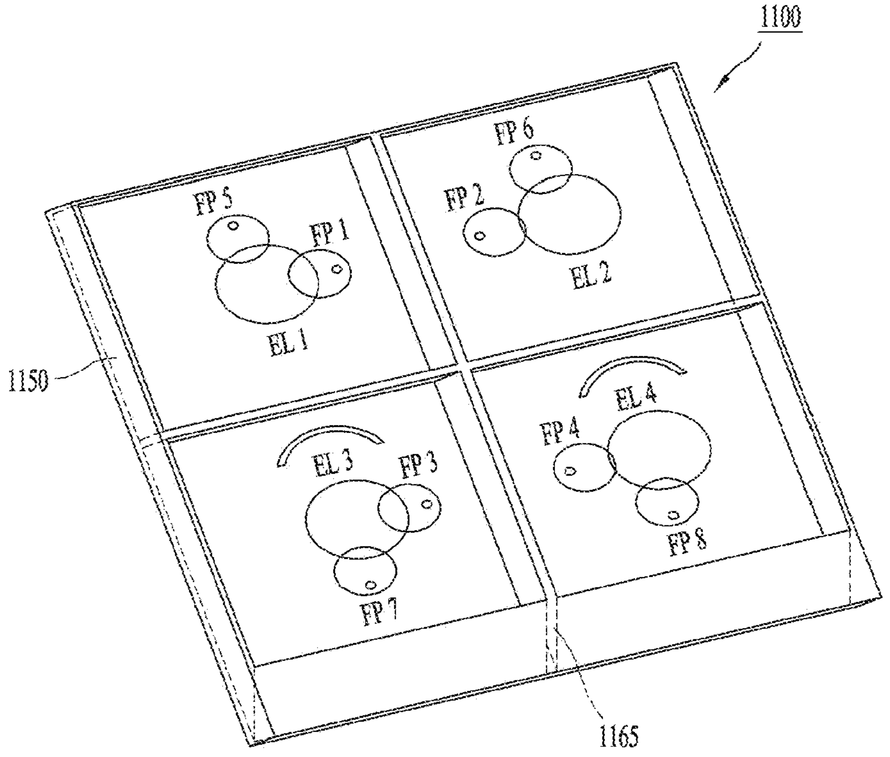
FIG. 16 shows a structure of a 2×2 array antenna according to the present disclosure.
Figure 17A:
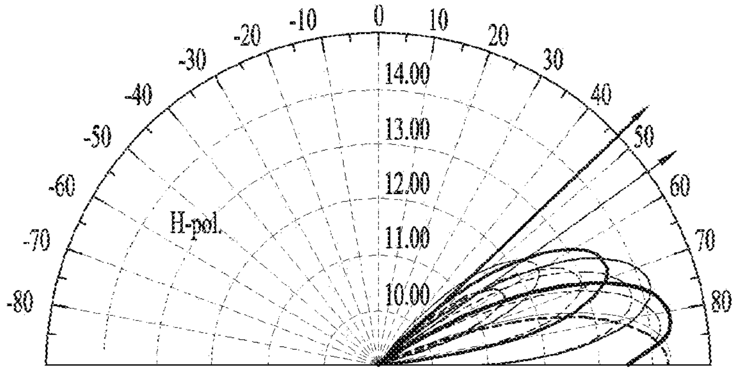
FIGS. 17A and 17B show beam patterns when a horizontally polarized signal and a vertically polarized signal are applied to the 2×2 array antenna of FIG. 16.
Figure 17B:
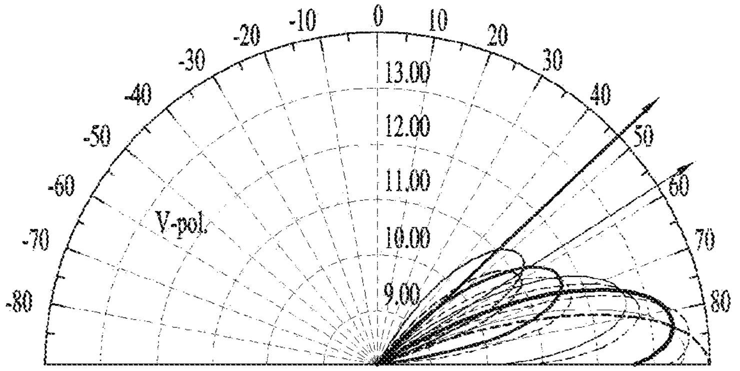

Meanwhile, the antenna structure disclosed in the present disclosure may be expanded to an array antenna having a two-dimensional structure in one axial direction and another axis perpendicular thereto. In this regard, FIG. 16 shows a structure of a 2×2 array antenna according to the present disclosure. Meanwhile, FIGS. 17A and 17B show beam patterns when a horizontally polarized signal and a vertically polarized signal are applied to the 2×2 array antenna of FIG. 16.

With regard to FIGS. 8A to 11C, and FIG. 16, the array antenna may be implemented as a 2×2, 2×4, 4×2, 4×4, M×N array antenna, and the like. In this regard, the rolled ground structure 1160 may be disposed in a lower region of the multi-layer substrate constituting the antenna module 1100 or only in a lower partial region thereof. Meanwhile, the dummy patch 1110*d* may be disposed in an upper region for all of the patch antennas 1110*a*.

An antenna gain in a forward direction is also important in the embodiments of the present disclosure. In order to simultaneously obtain such a high antenna gain in a forward direction and wide beam coverage performance in an upward direction, the rolled ground structure 1160 may be disposed only in a lower row of the array antenna.

The position of a first feed pad 1120*a* for a horizontal polarization (H-pol.) may be disposed in a left or right region of the patch antenna 1110*a*. The position of a second feed pad 1120*b* for a vertical polarization (V-pol.) may be disposed in an upper or lower region of the patch antenna 1110*a*, but in this embodiment, it is all disposed in the lower region.

Referring to FIGS. 8A to 11C, 16, and 17A, beam coverage for a horizontal polarization (H-pol.) may be about 43 degrees. In this regard, in the absence of the dummy patch 1110*d* and the rolled ground structure 1160, beam coverage for a horizontal polarization (H-pol.) may be about 35 degrees. Accordingly, the beam coverage of the dummy patch 1110*d* and the rolled ground structure 1160 according to the present disclosure may be expanded by about 8 degrees.

Referring to FIGS. 16 and 17B, beam coverage for a vertical polarization (V-pol.) may be about 43 degrees. In this regard, in the absence of the dummy patch 1110*d* and the rolled ground structure 1160, beam coverage for a vertical polarization (V-pol.) may be about 32 degrees. Accordingly, the beam coverage of the dummy patch 1110*d* and the rolled ground structure 1160 according to the present disclosure may be expanded by about 11 degrees.

Referring to FIGS. 8A, 8B, and 16, an antenna module 1100 in which one end of a ground wall between array antennas is configured with a multi-layer ground structure will be described. The antenna module 1100 may constitute an array antenna in which a plurality of radiators 1110 are arranged at a predetermined distance in at least one axial direction. The array antenna may include a first antenna element EL1 and a second antenna element EL2 adjacent to the first antenna element EL1 in a lower region thereof. Furthermore, the array antenna may further include a third antenna element EL3 and a fourth antenna element EL4 adjacent to the third antenna element EL3 in an upper region thereof.

The ground wall 1165 may be disposed in a side surface region of the multi-layer substrate. Meanwhile, the multi-layer ground structure 1160 may be disposed between the first antenna element EL1 and the second antenna element EL2. The multi-layer ground structure 1160 may be disposed in one region of the multi-layer substrate, for example, a lower region thereof.

The first to fourth feed patches FP1 to FP4 may constitute the feed structure 1120. The first to fourth feed patches FP1 to FP4 are configured to apply a first signal having a first polarization to the first to fourth antenna elements EL1 to EL4. Meanwhile, fifth to eighth feed patches FP5 to FP8 are configured to apply a second signal having a second polarization to the first to fourth antenna elements EL1 to EL4.

The first feed patch FP1 may be disposed in one region of the first antenna element EL1 in one axial direction, and the second feed patch FP2 may be disposed in the other region of the second antenna element EL2 in an upper region of the multi-layer substrate. In addition, the third feed patch FP3 may be disposed in one region of the third antenna element EL3 in one axial direction, and the fourth feed patch FP4 may be disposed in the other region of the fourth antenna element EL4 in a lower region of the multi-layer substrate.

The multi-layer ground structure 1160 may be disposed at one end of the multi-layer substrate, that is, at an end of a lower region thereof. Additionally, the multi-layer ground structure 1160 may be disposed between feed patches adjacent thereto having a first polarization. The multi-layer ground structure 1160 may be disposed between the third feed patch FP3 and the fourth feed patch FP4.

Figure 18A:
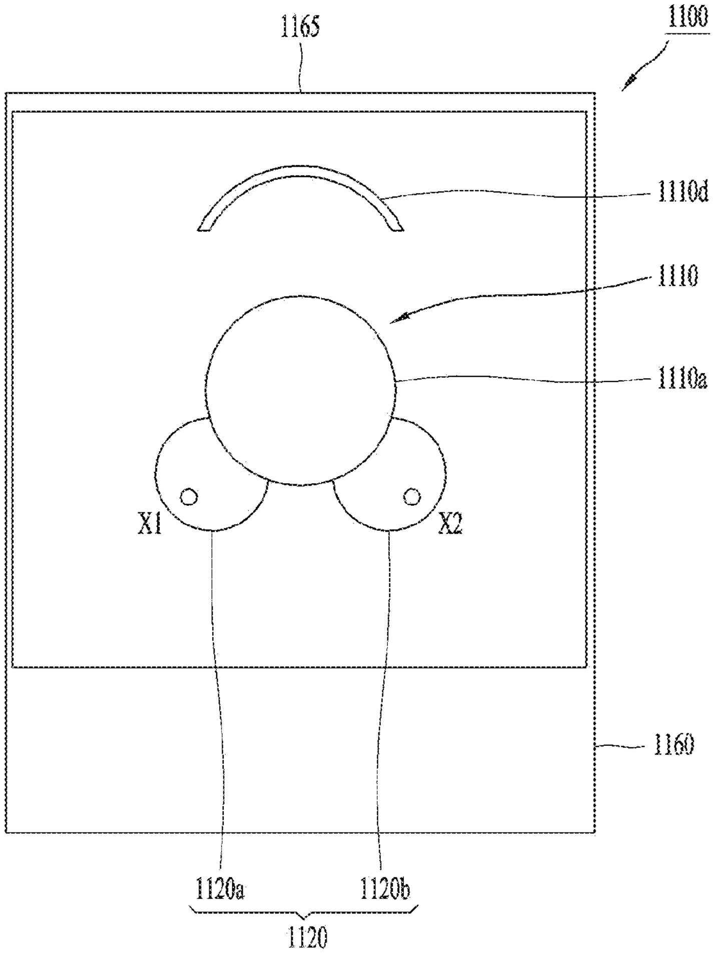
FIG. 18A shows a front view of an antenna structure in which first and second feed pads are disposed in a diagonal direction according to an embodiment. Meanwhile.

In order to equalize beam coverage in a dual polarized structure, a direction in which the dual polarized structure is formed in the antenna module according to the present disclosure needs to be formed in a diagonal direction. In this regard, FIG. 18A shows a front view of an antenna structure in which first and second feed pads are disposed in a diagonal direction according to an embodiment. Meanwhile, FIG. 18B shows a radiation pattern in the antenna structure of FIG. 18A.

Referring to FIG. 18A, beam coverage may be formed to be almost the same for a first polarization (X1-pol.) and a second polarization (X2-pol.) through a dual polarized structure using the first polarization (X1-pol.) and the second polarization (X2-pol.) that are substantially orthogonal to each other in a diagonal direction.

Figure 18B:
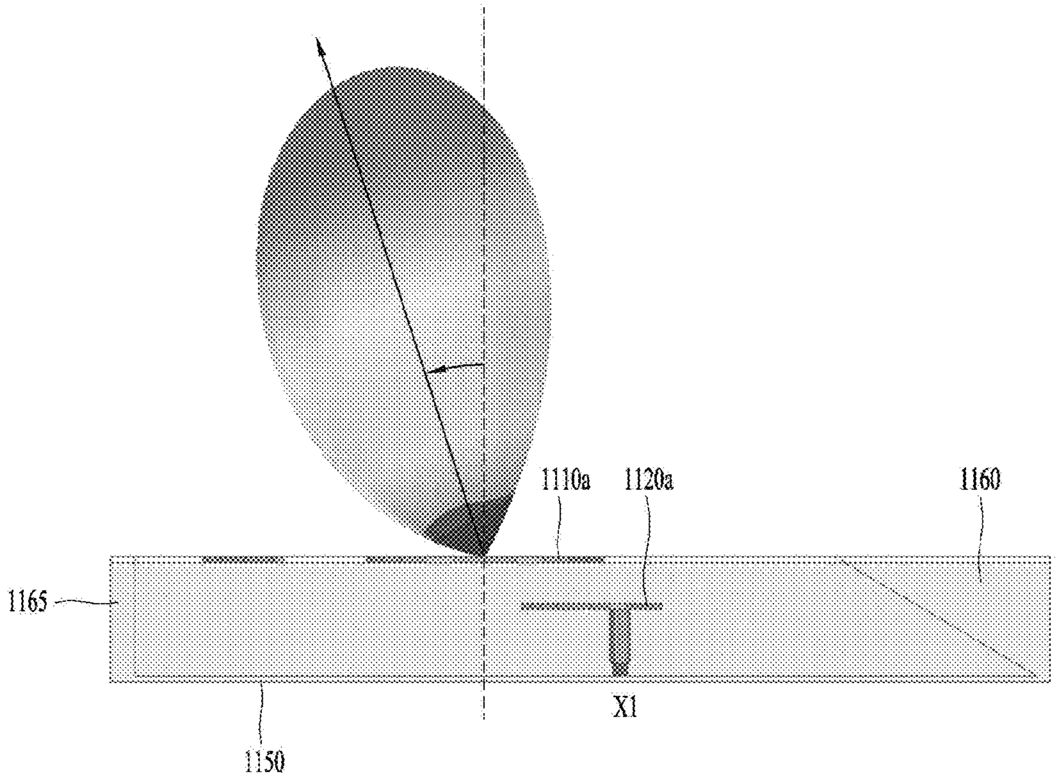
FIG. 18B shows a radiation pattern in the antenna structure of FIG. 18A.

In case where the antenna operates with the first polarization (X1-pol.) of FIG. 18A, a phenomenon in which the radiation pattern is adjusted upward as shown in FIG. 18B occurs similarly to the antenna operating with a horizontal polarization. Referring to FIG. 18B, it can be seen that when the antenna operates with the first polarization (X1-pol.), the radiation pattern is tilted upward at a predetermined angle around a vertical axis.

Figure 19A:
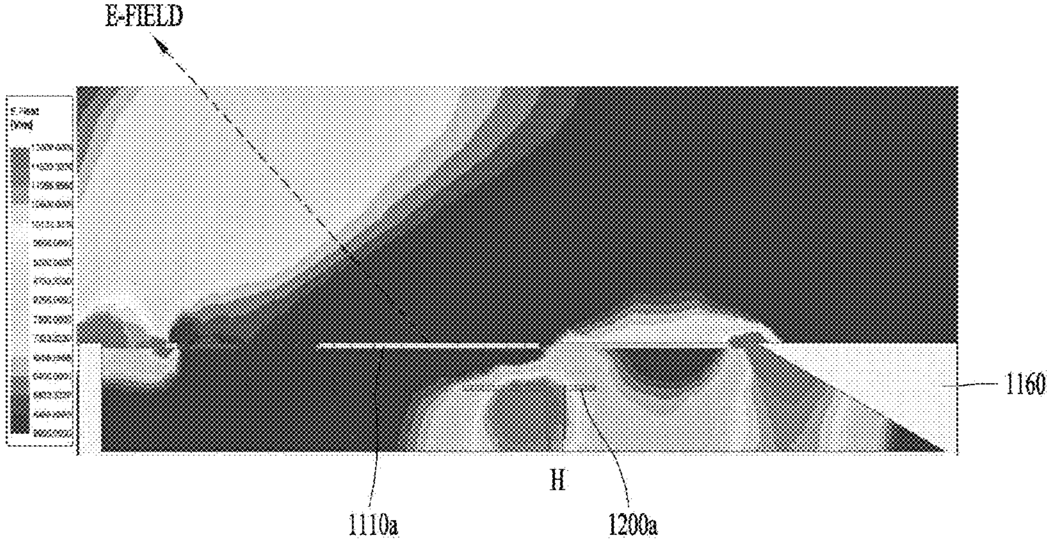
FIG. 19A shows an electric field distribution of the antenna structure according to FIG. 18A.
Figure 19B:
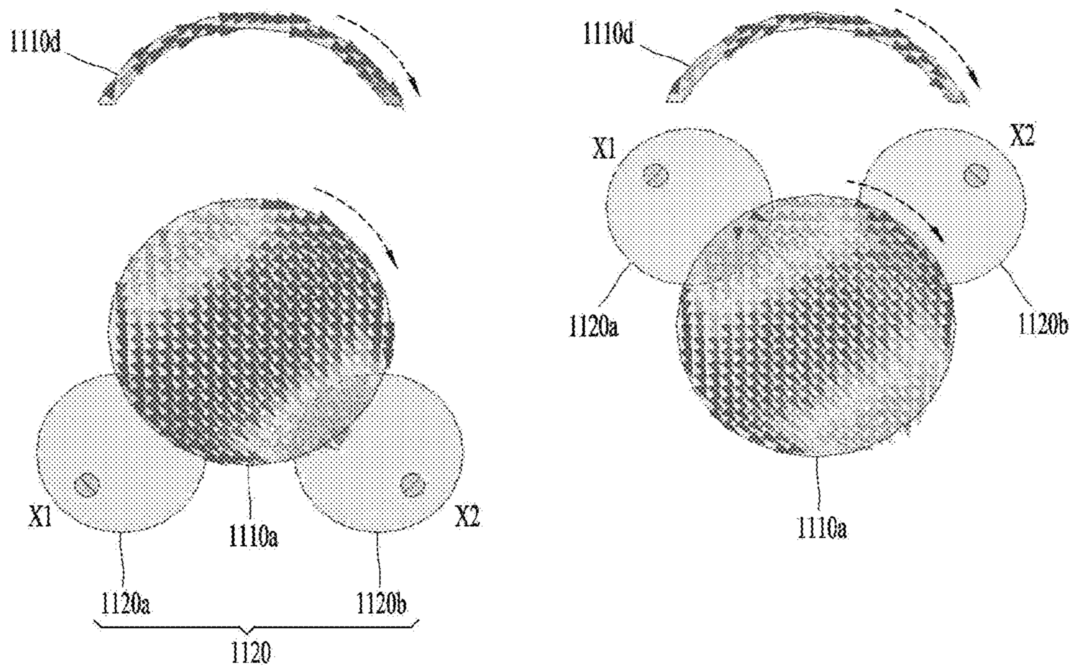
FIG. 19B shows a current distribution formed in a conductor of the antenna structure according to FIG. 18A.

Meanwhile, an electric field distribution of the antenna structure according to FIG. 18A and a current distribution formed in a conductor of the antenna structure will be described. In this regard, FIG. 19A shows an electric field distribution of the antenna structure according to FIG. 18A. FIG. 19B shows a current distribution formed in a conductor of the antenna structure according to FIG. 18A.

Referring to FIG. 19A, an electric field distribution (E-field distribution) from the side of the antenna structure to which a diagonally polarized signal is applied is shown. Referring to FIGS. 18B to 19A, it can be seen that the electric field distribution is strongly concentrated in a region of the rolled ground structure 1160 and the dummy patch 1110*d*. It can be seen that the direction of the electric field is tilted and directed upward due to this effect.

Referring to FIG. 19B, in an embodiment that operates with the first polarization (X1-pol.), it can be seen that the direction of a current formed in the patch antenna 1110*a* and the direction of a current formed in the dummy patch 1110*d* are the same direction. In this regard, it indicates that the antenna operates normally regardless of whether the first feed pad 1120*a* and the second feed pad 1120*b* in the form of a coupling pad are positioned in an upper region or lower region thereof. Therefore, the position of a coupling pad that transmits a diagonally polarized signal may be disposed in any region, whether it is an upper region or lower region.

Meanwhile, the antenna module disclosed in the present disclosure may be disposed in a partial region, for example, a lower region, of the electronic device in FIGS. 1, 4, 5A, 5B, 6, and 7A. Therefore, referring to FIGS. 1 to 20B, an electronic device including an antenna module according to another aspect of the present disclosure will be described. In this regard, the foregoing full description of the antenna structure having a rolled ground structure and a dummy patch may also be applied in combination to the following description.

Referring to FIGS. 5C to 7B, the electronic device 1000 may include an antenna module 1100, a transceiver circuit 1250, and a main PCB 1020. In this regard, the antenna module 1100 may be implemented as an array antenna. The antenna module 1100 may be implemented as two or more antenna modules so as to be disposed in different regions of the electronic device. The antenna module 1100 may be disposed in a partial region of the multi-layer substrate 1010, but the antenna module 1100 is not limited thereto and may be implemented as a multi-layer substrate as shown in FIG. 8A.

The transceiver circuit 1250 may be disposed in the antenna module 1100 configured with a multi-layer substrate. The transceiver circuit 1250 may be disposed in a lower region of the antenna module 1100, but is not limited thereto. The main PCB 1020 may be disposed inside the electronic device to be operably coupled to the multi-layer substrate. A processor 1400 corresponding to a modem may be disposed on the main PCB 1020.

Referring to FIGS. 8A to 20B, the antenna module 1100 may be disposed on an inner region or upper region of the multi-layer substrate, and may include a radiator 1110 configured with at least one conductive layer to radiate a wireless signal. The antenna module 1100 may further include a feed structure 1120 connected to the radiator 1110 through a signal via disposed in a lower region of the radiator 1110. The antenna module 1100 may further include a lower ground layer 1150 disposed in a lower region of the conductive layer constituting the radiator 1110 and configured to operate as a ground for the radiator 1110. The antenna module 1100 may include a multi-layer ground structure 1160 connected to the lower ground layer 1150 and configured to have a different end position for each layer so as to be spaced apart by a different distance from the radiator 1110 for each layer of the multi-layer substrate.

The multi-layer ground structure 1160 of the antenna module 1100 may further include a dummy patch **1110*d* disposed in one region of the radiator 1110, and disposed in the other region of the radiator 1110 to be spaced apart by a predetermined distance from the radiator 1110. The radiator 1110 and the dummy patch 1110*d* may be disposed in the same layer, and the dummy patch 1110*d* may be disposed along an outline of the radiator 1110** to correspond to a shape of the radiator.

The radiator 1110 may include a first radiator **1110*a* disposed in a first layer of the multi-layer substrate and a second radiator 1120*a* corresponding to the feed structure 1120. The second radiator 1120*a* may be disposed in a second layer, which is a lower region of the first radiator 1110*a*, to be offset from the center of the first radiator 1110*a*. The second radiator 1120*a* may be configured with a second conductive layer that transmits a wireless signal to the first radiator 1110*a***.

The multi-layer ground structure 1160 may be a first ground structure 1161 configured such that a vertical via is disposed in one side region of the multi-layer substrate. The multi-layer ground structure 1160 may further include a second ground structure 1162 connected to the lower ground layer 1150 by a second vertical via at a second position spaced apart by a predetermined distance from one side end of the multi-layer substrate.

The antenna module 1100 may constitute a one-dimensional or two-dimensional array antenna as shown in FIG. 14 or FIG. 16 in which a plurality of radiators 1110 are arranged at a predetermined distance in at least one axial direction. The array antenna may include a first antenna element EL1 and a second antenna element EL2 adjacent to the first antenna element EL1. One end of the ground wall 1150 disposed between the first antenna element EL1 and the second antenna element EL2 may be configured with the multi-layer ground structure 1160.

Meanwhile, the processor 1400 disposed on the main PCB 1020 in FIG. 5C may be configured to control the transceiver circuit 1250 such that the array antenna radiates a wireless signal to another electronic device.

The radiator 1110 of the antenna module 1100 may be configured with a stacked radiator structure as shown in FIG. 10B. The radiator 1110 may an upper radiator **1110*a* be disposed in a first layer of the multi-layer substrate, and configured to operate in a first frequency band. The radiator 1110 may further include a lower radiator 1110*b* disposed in a second layer, which is a lower region of the upper radiator 1110*a*, and disposed to have a larger size than the upper radiator 1110*a*** so as to operate in a second frequency band lower than the first frequency band.

The processor 1400 may control the transceiver circuit 1250 to perform wireless communication using a first wireless signal in a first band radiated through the upper radiator **1110*a* of the array antenna. In case where the quality of the first wireless signal is below a threshold, the processor 1400 may control the transceiver circuit 1250 to perform wireless communication using a second wireless signal in a second band radiated through the lower radiator 1110*b*** of the array antenna.

The transceiver circuit 1250 may apply a first signal in a first band to the lower radiator **1110*b* through a first feed line connected to the feed structure 1120. The transceiver circuit 1250 may apply a second signal in a second band to the lower radiator 1110*b* through a second feed line connected to the feed structure 1120**.

Figure 20A:
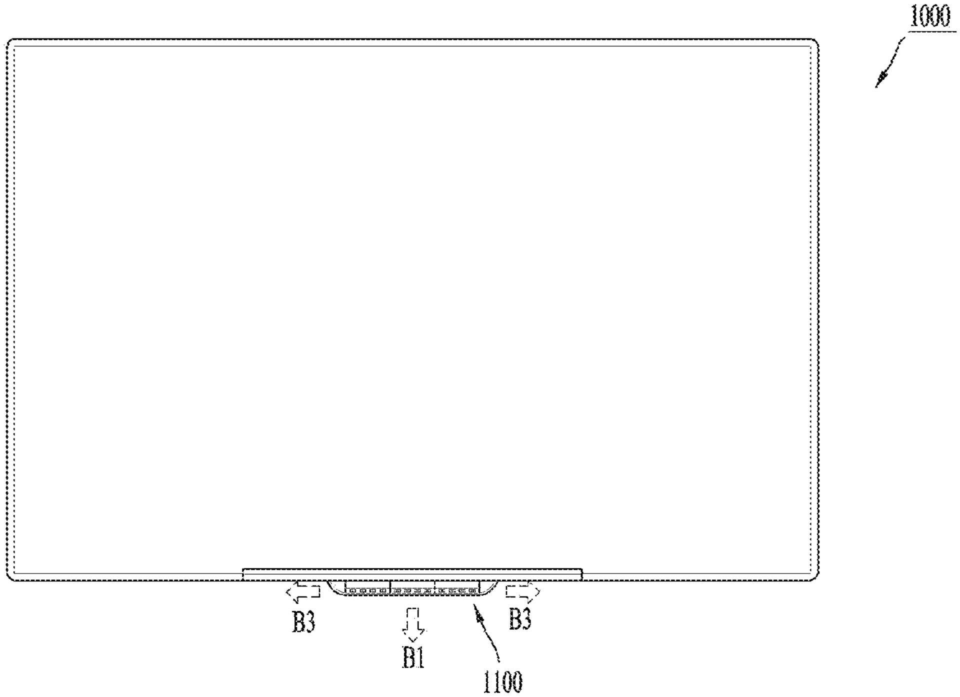
FIG. 20A shows a structure in which an antenna module 1100 having a first type antenna and a second type antenna as array antennas is disposed in an electronic device 1000.
Figure 20B:
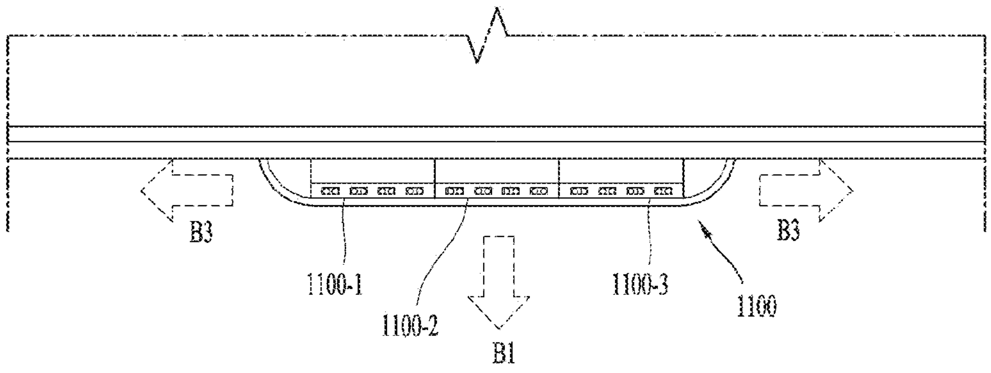
FIG. 20B is an enlarged view showing a plurality of array antenna modules.

The antenna structure implemented with a rolled ground structure and a dummy patch disclosed in the present disclosure may be configured as an array antenna. In this regard, FIG. 20A shows a structure in which an antenna module 1100 having a first type antenna and a second type antenna as array antennas is disposed in the electronic device 1000. FIG. 20B is an enlarged view showing a plurality of array antenna modules.

Referring to FIGS. 1 to 20B, the array antenna may include a first array antenna module 1100-1, and a second array antenna module 1100-2 spaced apart by a predetermined distance from the first array antenna module 1100-1. Meanwhile, the number of array antennas is not limited to two, but may alternatively be three or more as illustrated in FIG. 21B. Therefore, the array antenna may include a first array antenna module 1100-1 to a third array antenna module 1100-3. As one example, at least one of the first array antenna module 1100-1 and the third array antenna module 1100-3 may be disposed on a side surface of the antenna module 1100 and thus configured to form a beam in a side direction B2, B3.

As another example, at least one of a first array antenna module 1100-1 and a third array antenna module 1100-3 may be disposed on a front surface of the antenna module 1100 and thus configured to form a beam in a front direction B1. In this regard, the first array antenna module 1100-1 and the second array antenna module 1100-2 may form a first beam and a second beam in the front direction B1. The processor 1400 corresponding to the modem of FIG. 5C may control the first and second array antenna modules 1100-1 and 1100-2 to form the first beam and the second beam in the first direction and the second direction, respectively. That is, the processor 1400 may control the first array antenna module 1100-1 to form the first beam horizontally in the first direction. Also, the processor 1400 may control the second array antenna module 1100-2 to form the second beam horizontally in the second direction. In this regard, the processor 1400 may perform MIMO using the first beam of the first direction and the second beam of the second direction.

The processor 1400 corresponding to the modem of FIGS. 5C and 9 may control the first and second array antenna modules 1100-1 and 1100-2 to form the first beam and the second beam in the first direction and the second direction, respectively. That is, the processor 1400 may control the first array antenna module 1100-1 to form the first beam horizontally in the first direction. Also, the processor 1400 may control the second array antenna module 1100-2 to form the second beam horizontally in the second direction. In this regard, the processor 1400 may perform MIMO using the first beam of the first direction and the second beam of the second direction.

The processor 1400 may form a third beam in a third direction using the first and second array antenna module 1100-1 and 1100-2. In this regard, the processor 1400 may control the transceiver circuit 1250 to synthesize signals received through the first and second array antenna modules 1100-1 and 1100-2. Also, the processor 1400 may control the transceiver circuit 1250 to distribute the signals transferred to the first and second array antenna modules 1100-1 and 1100-2 into each antenna element. The processor 1400 may perform beamforming using the third beam that has a beam width narrower than those of the first beam and the second beam.

Meanwhile, the processor 1400 may perform MIMO using the first beam of the first direction and the second beam of the second direction, and perform beamforming using a third beam having the narrower beam width than those of the first beam and the second beam. In relation, when a first signal and a second signal received from other electronic devices in the vicinity of the electronic device have qualities lower than or equal to a threshold value, the processor 1400 may perform beamforming using the third beam.

The number of elements of the array antenna may be two, three, four, and the like as illustrated, but is not limited thereto. For example, the number of elements of the array antenna may be expanded to two, four, eight, sixteen, and the like. Therefore, the array antenna may be configured as 1×2, 1×3, 1×4, 1×5, . . . , 1×8 array antenna.

Figure 21:
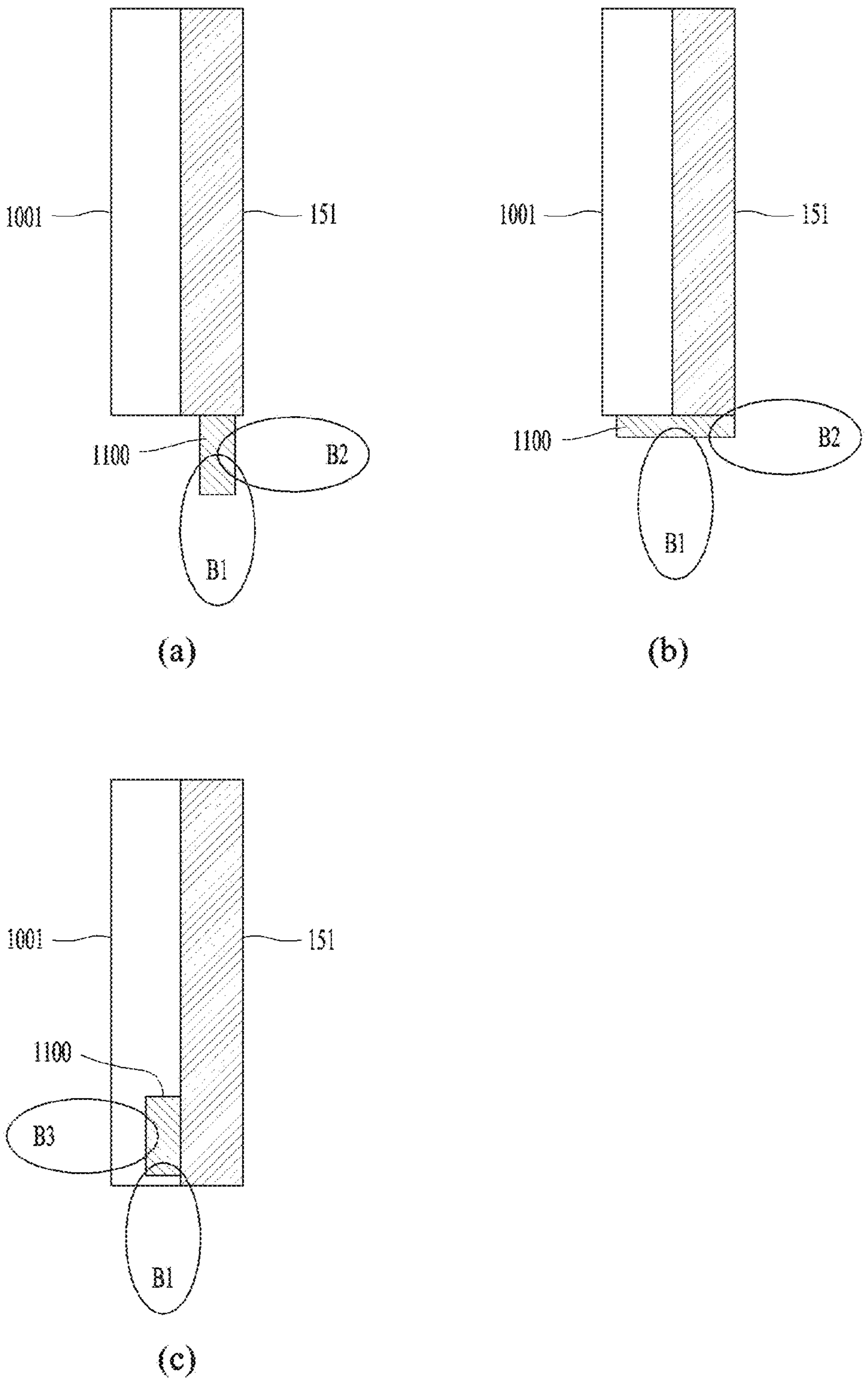
FIG. 21 shows antenna modules coupled in different coupling structures at specific positions of an electronic device according to embodiments.

Meanwhile, FIG. 21 shows antenna modules coupled in different coupling structures at specific positions of an electronic device according to embodiments. Referring to (a) of FIG. 21, the antenna module 1100 may be disposed substantially horizontal to the display 151 in a lower region of the display 151. Accordingly, a beam B1 can be generated in a downward direction of the electronic device through the antenna element. On the other hand, another beam B2 may be generated in a forward direction of the electronic device through an antenna element.

Referring to (b) of FIG. 21, the antenna module 1100 may be disposed substantially vertical to the display 151 in the lower region of the display 151. Accordingly, a beam B2 may be generated in a forward direction of the electronic device through the antenna element. On the other hand, another beam B1 may be generated in a downward direction of the electronic device through the antenna element.

Referring to (c) of FIG. 21, the antenna module 1100 may alternatively disposed inside a rear case 1001 corresponding to a mechanism structure. The antenna module 1100 may be disposed inside the rear case 1001 to be substantially parallel to the display 151. Accordingly, a beam B1 can be generated in a downward direction of the electronic device through the antenna element. On the other hand, another beam B3 may be generated in a rearward direction of the electronic device through the antenna element.

So far, the broadband antenna module operating in the millimeter wave (mm Wave) band and the electronic device having the same have been described. Hereinafter, technical effects of a broadband antenna module operating in a millimeter wave (mmWave) band and an electronic device having the same will be described.

Hereinafter, technical effects of a broadband antenna module operating in a millimeter wave (mm Wave) band and an electronic device having the same will be described.

According to an embodiment, a broadband antenna module operating in a millimeter wave band may be disposed in an electronic device to provide a high-speed communication service with another electronic device.

According to an embodiment, a ground structure of an antenna module operating in a millimeter wave band may be optimized to change a direction of a signal radiated from an antenna element so as to provide a highly reliable, high-speed communication service between electronic devices.

According to an embodiment, a ground structure and a dummy patch structure of an antenna module operating in a millimeter wave band may be optimized to prevent communication disconnection even when there is an obstacle on a communication path.

According to an embodiment, a radiation pattern of a signal radiated from an antenna element may be tilted by a predetermined angle from a vertical direction without beamforming, thereby preventing communication disconnection even when there is an obstacle on a communication path.

According to an embodiment, a multi-layer ground structure may be optimized without disposing an antenna module at an angle to allow a radiation pattern of a signal radiated from an antenna element to be tilted by a predetermined angle from a vertical direction.

Further scope of applicability of the present disclosure will become apparent from the following detailed description. It should be understood, however, that the detailed description and specific examples, such as the preferred embodiments of the present disclosure, are given by way of illustration only, since various modifications and alternations within the concept and scope of the disclosure will be apparent to those skilled in the art.

In relation to the aforementioned disclosure, design and operations of an antenna operating in an mmWave band and an electronic device controlling the same can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An antenna module implemented as a multi-layer substrate, the antenna module comprising:

a radiator having at least one conductive layer and disposed at an inner region or upper region of the multi-layer substrate, wherein the radiator is configured to radiate a wireless signal;

a lower ground layer disposed at a lower region of the at least one conductive layer and configured to operate as a ground for the radiator;

wherein the radiator comprises:

a first patch antenna disposed in a first layer, a feed structure including a second patch antenna disposed to be offset in one axial direction from a center of the first patch antenna in a second layer which is a lower layer of the first patch antenna, and configured to transmit a first feed signal to the first patch antenna;

the feed structure including a third patch antenna disposed to be offset in another axial direction orthogonal to the one axial direction and configured to transmit a second feed signal to the first patch antenna; and a multi-layer ground structure connected to the lower ground layer, and disposed at one side region of the multi-layer substrate, wherein respective ends of layers of the multi-layer ground structure are spaced apart from the radiator by different distances, wherein the multi-layer ground structure is configured to have a plurality of ground layers, and wherein the plurality of ground layers are disposed in a side region as being disposed in the lower region, and configured to further decrease a length of each ground layer disposed in each the plurality of ground layer layers in the one axial direction in the lower region.

2. The antenna module of claim 1, wherein the multi-layer ground structure comprises vertical vias vertically connecting adjacent ground layers, and wherein a number of vertical vias disposed between the adjacent ground layers decreases with each ground layer toward a first direction.

3. The antenna module of claim 1, further comprising a dummy patch disposed to be spaced apart from the first patch antenna at another side region of the multi-layer substrate.

4. The antenna module of claim 3, wherein the first patch antenna and the dummy patch are disposed in the same layer, and the dummy patch is disposed along an outline of the first patch antenna to correspond to a shape of the first patch antenna.

5. The antenna module of claim 3, wherein the first patch antenna is a circular patch disposed in the first layer of the multi-layer substrate, and the dummy patch is shaped in an arc shapes in the first layer.

6. The antenna module of claim 2, wherein the multi-layer ground structure comprises:

a first ground structure configured such that the vertical vias are disposed at the side region of the multi-layer substrate; and a second ground structure configured to be connected to the lower ground layer by a second vertical via and spaced apart from one side end of the multi-layer substrate.

7. The antenna module of claim 2, wherein the multi-layer ground structure comprises:

a first ground structure configured such that the vertical vias are disposed at the side region of the multi-layer substrate;

a ground wall connected to the lower ground layer and forming another side region of the multi-layer substrate; and a third ground structure disposed at a lower region of the dummy patch between the ground wall and the first patch antenna, and connected to the lower ground layer by a third vertical via.

8. The antenna module of claim 6, wherein the multi-layer ground structure comprises:

a first ground structure configured such that vertical vias connecting layers of the multi-layer ground structure are disposed at one side region of the multi-layer substrate and a first ground layer of the first ground structure has a first length; and a second ground structure connected to the lower ground layer by a second vertical via and spaced apart from one side end of the multi-layer substrate, wherein a layer of the second ground structure has a second length shorter than the first length, wherein the first ground structure is configured to operate with the lower radiator in the second frequency band, and the second ground structure is configured to operate with the upper radiator in the first frequency band.

9. The antenna module of claim 3, wherein the dummy patch comprises:

a first dummy patch disposed between the first patch antenna and a ground wall disposed a first side region of the multi-layer substrate; and a second dummy patch disposed between the first patch antenna and the multi-layer ground structure disposed at a second side region of the multi-layer substrate, wherein the second dummy patch comprises:

a first dummy pattern disposed at the first layer of the multi-layer substrate; and a second dummy pattern disposed to be spaced apart from the first dummy pattern at a second layer which is the lower layer of the first layer.

10. The antenna module of claim 3, wherein the dummy patch comprises:

a first dummy patch disposed between the radiator and a ground wall disposed a first side region of the multi-layer substrate; and a second dummy patch disposed between the radiator and the multi-layer ground structure disposed at a second side region of the multi-layer substrate, wherein the second dummy patch comprises:

a first dummy pattern disposed at the first layer of the multi-layer substrate; and a second dummy pattern disposed to be spaced apart from the first dummy pattern at the first layer.

11. The antenna module of claim 3, wherein the dummy patch comprises:

a first dummy patch disposed between the radiator and a ground wall disposed a first side region of the multi-layer substrate; and a second dummy patch disposed between the radiator and the multi-layer ground structure disposed at a second side region of the multi-layer substrate, wherein the second dummy patch comprises:

a first dummy pattern disposed at the first layer of the multi-layer substrate; and a second dummy pattern disposed at a second layer which is the lower layer of the first layer and connected to the first dummy pattern by vertical vias.

* * * * *